(12) United States Patent
Janssen

(10) Patent No.: US 12,001,057 B2
(45) Date of Patent: Jun. 4, 2024

(54) BIDIRECTIONAL FILTER

(71) Applicant: Lumentum Operations LLC, San Jose, CA (US)

(72) Inventor: Adrian Perrin Janssen, Devon (GB)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/648,765

(22) Filed: Jan. 24, 2022

(65) Prior Publication Data

US 2023/0106876 A1 Apr. 6, 2023

Related U.S. Application Data

(60) Provisional application No. 63/261,985, filed on Oct. 1, 2021.

(51) Int. Cl.
| | |
|---|---|
| *H04J 14/02* | (2006.01) |
| *G02B 6/12* | (2006.01) |
| *G02B 6/293* | (2006.01) |
| *H04B 10/25* | (2013.01) |
| *H04B 10/40* | (2013.01) |
| *H04Q 11/00* | (2006.01) |

(52) U.S. Cl.
CPC ....... *G02B 6/2935* (2013.01); *G02B 6/12007* (2013.01); *H04B 10/2589* (2020.05); *H04J 14/0208* (2013.01); *G02B 2006/12159* (2013.01); *H04B 10/40* (2013.01); *H04J 14/02* (2013.01); *H04J 14/0265* (2013.01); *H04J 14/0307* (2023.08); *H04Q 2011/0016* (2013.01)

(58) Field of Classification Search
CPC .............. G02B 6/2935; G02B 6/12007; G02B 2006/12159; G02B 6/29386; H04B 10/2589; H04B 10/40; H04J 14/0208; H04J 14/02; H04J 14/0265; H04J 14/0307; H04Q 2011/0016; H04Q 2213/1301
USPC .................................. 398/43–103, 135–139
See application file for complete search history.

(56) References Cited

U.S. PATENT DOCUMENTS

| | | | | |
|---|---|---|---|---|
| 6,125,220 A * | 9/2000 | Copner | ............. | G02B 6/29358 398/1 |
| 6,275,322 B1 * | 8/2001 | Tai | ......... | G02B 5/284 359/279 |
| 6,469,790 B1 * | 10/2002 | Manning | ............... | G01J 3/0202 356/451 |
| 6,785,000 B2 * | 8/2004 | Liang | ................. | G02B 6/29347 356/450 |
| 7,433,054 B1 * | 10/2008 | Tischhauser | ............. | G01J 3/26 356/519 |
| 8,411,350 B2 * | 4/2013 | Fu | .......... | H04B 10/11 359/325 |

(Continued)

*Primary Examiner* — Dibson J Sanchez
(74) *Attorney, Agent, or Firm* — Harrity & Harrity, LLP

(57) ABSTRACT

A bidirectional optical device includes a first optical component, wherein a portion of a first interface of the first optical component has a reflector coating, wherein a second interface of the first optical component has an optical coating, and wherein the first optical component includes an internal splitting interface disposed between the first interface and the second interface, and a second optical component including a reflector aligned to the second interface of the first optical component, wherein the first optical component and the second optical component comprise an unbalanced Mach-Zehnder (MZ) interferometer.

20 Claims, 23 Drawing Sheets

(56) References Cited

U.S. PATENT DOCUMENTS

| | | | | |
|---|---|---|---|---|
| 8,570,524 | B2* | 10/2013 | Wan | G01B 9/02051 |
| | | | | 356/451 |
| 2001/0040681 | A1* | 11/2001 | Paiam | G02B 6/29338 |
| | | | | 356/480 |
| 2002/0154313 | A1* | 10/2002 | Zhou | G02B 6/29395 |
| | | | | 359/577 |
| 2002/0154314 | A1* | 10/2002 | Copner | G02B 6/29395 |
| | | | | 356/450 |
| 2002/0171908 | A1* | 11/2002 | Copner | G02B 6/12007 |
| | | | | 359/278 |
| 2007/0070505 | A1* | 3/2007 | Hsieh | H04B 10/677 |
| | | | | 359/578 |
| 2016/0124146 | A1* | 5/2016 | Li | G02B 6/42 |
| | | | | 385/14 |
| 2019/0145825 | A1* | 5/2019 | Janssen | H04B 10/572 |
| | | | | 356/451 |

* cited by examiner

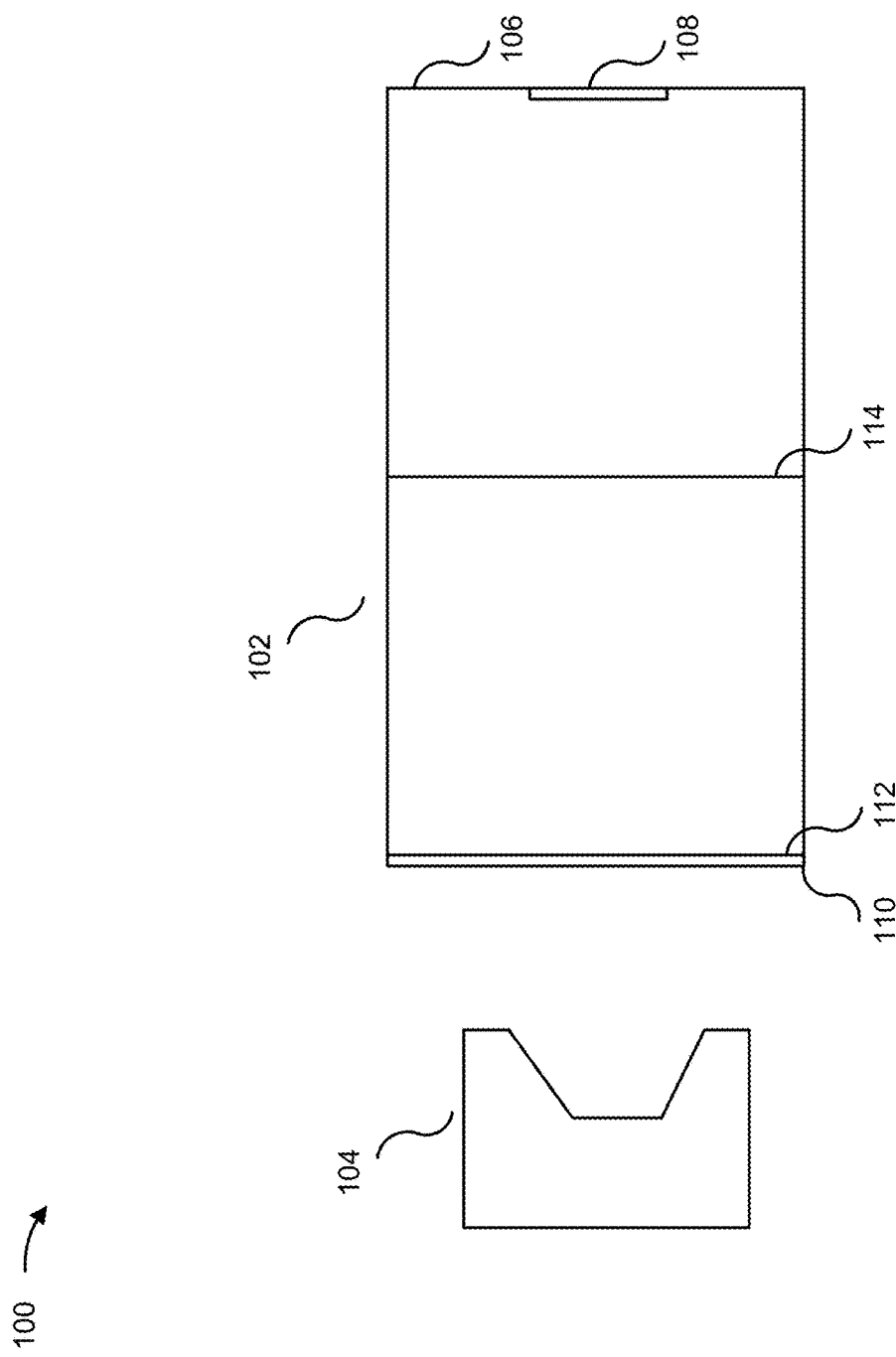

BIDIRECTIONAL FILTER

CROSS-REFERENCE TO RELATED APPLICATION

This Patent Application claims priority to U.S. Provisional Patent Application No. 63/261,985, filed on Oct. 1, 2021, and entitled "FREE SPACE COMPACT WAVELENGTH INTERLEAVER." The disclosure of the prior Application is considered part of and is incorporated by reference into this Patent Application.

TECHNICAL FIELD

The present disclosure relates generally to an optical device and in particular to a free space compact wavelength interleaver with a flat top response for optical communications.

BACKGROUND

An optical interleaver may be used in an optical communication system, such as a fiber-optic telecommunications system, to multiplex two signals together. For example, in a wavelength division multiplexed single-fiber optical communication system, an optical interleaver may interleave alternate channel frequencies in a transmit direction and a receive direction.

SUMMARY

In some implementations, a bidirectional optical device includes a first optical component, wherein a portion of a first interface of the first optical component has a reflector coating, wherein a second interface of the first optical component has an optical coating, wherein the first optical component includes an internal splitting interface disposed between the first interface and the second interface, and a second optical component including a reflector aligned to the second interface of the first optical component, wherein the first optical component and the second optical component comprise an unbalanced Mach-Zehnder (MZ) interferometer. In some implementations, the first optical component is a glass material. In some implementations, the optical coating is an anti-reflectance coating or a reflector coating. In some implementations, the bidirectional optical device includes an air-ring resonator.

In some implementations, a finite impulse response (FIR) optical device includes a first optical component including a first anti-reflectance coating on a first portion of a first surface and a second anti-reflectance coating on a first portion of a second surface; a second optical component including a first reflector; and a third optical component including a second reflector, wherein the first optical component is disposed between the second optical component and the third optical component with respective air gaps separating the first optical component from the second optical component and the third optical component. In some implementations, a frequency response for beams traversing the FIR optical device is a sinusoidal frequency response.

In some implementations, a bidirectional optical device includes a first optical component, wherein a portion of a first interface of the first optical component has a reflector coating, wherein a second interface of the first optical component has an anti-reflectance coating, wherein the first optical component includes a set of internal splitting interfaces disposed between the first interface and the second interface, and a set of second optical components including a corresponding set of reflectors, wherein the first optical component and the set of second optical components comprise a three-port unbalanced MZ interferometer.

In some implementations, an optical interleaver includes an optical component having a mirror-symmetric rhomboid shape, wherein the optical component has a first face forming a first interface and a second face forming a second interface, wherein the first interface is parallel with the second interface, and wherein the optical component includes at least one internal splitting interface. In some implementations, the optical interleaver may include a first mirror on a first side of the optical interleaver and a second mirror on a second side of the optical interleaver. In some implementations, the optical interleaver may include a first mirror and a second mirror positioned a same distance from a top of the optical interleaver. In some implementations, the first mirror and the second mirror are positioned different distances from a top of the optical interleaver.

BRIEF DESCRIPTION OF THE DRAWINGS

FIGS. 1A-1I are diagrams of an example bidirectional optical device described herein.

DETAILED DESCRIPTION

Figure 1B:
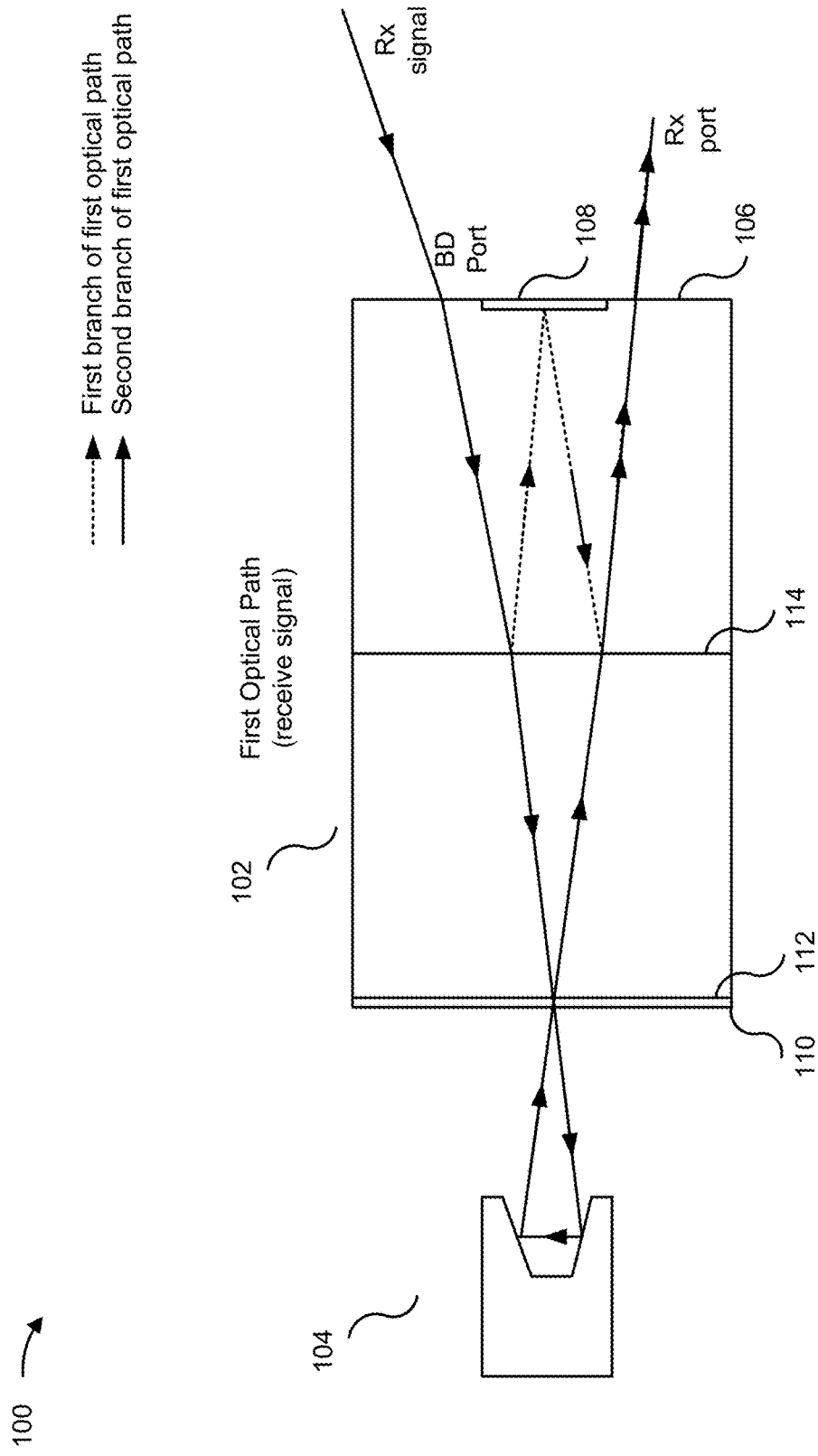

The following detailed description of example implementations refers to the accompanying drawings. The same reference numbers in different drawings may identify the same or similar elements.

One technique for constructing an optical interleaver uses a wavelength independent 50:50 beam-splitter. Such an optical interleaver may introduce loss on both the transmit direction and the receive direction. For a symmetric transmit-receive system, two such optical interleavers may be provided (e.g., at respective ends of the single-fiber optical communication system), resulting in loss being introduced on both the transmit direction and the receive direction at both of the optical interleavers. In one example, this insertion loss may be 3 decibels (dB) at each optical interleaver, resulting in a total insertion loss of 6 dB on the transmit direction and 6 dB on the receive direction. Additional loss may be introduced in an optical communication system as a result of cross-talk between a transmit beam and a receive beam. For example, when a wavelength independent 50:50 beam-splitter is used as an optical interleaver, 25% of a receive beam may be passed through toward a transmitter and 25% of a transmit beam may be passed through toward a receiver.

The interleaving losses and crosstalk losses may result in inefficiencies in an optical communication system. In an efficient bidirectional optical communication systems, frequency channels are discrete with a channel separation of at least an information bandwidth. This allows interleaving of the frequency channels (e.g., with alternating channels being occupied by transmit beams and receive beams). Moreover, it may be desirable to have the optical interleaver be periodically frequency dependent, which may enable minimization of cross-talk and total loss.

Some implementations described herein achieve low insertion loss, periodic frequency dependency, and a compact form factor using free-space optics-based structures (e.g., which may include thin film filters). For example, some implementations described herein provide a finite impulse response (FIR) filter, in which an optical path is finite and a transmission function is approximately sinusoidal. In this case, two Mach-Zehnder (MZ) interferometers with unequal path lengths may form the FIR filter. In another example, some implementations described herein provide an infinite impulse response (IIR) filter, in which a circulating (infinite) optical path is provided. In this case, the aforementioned two MZ interferometers may be configured with a circulating optical path to provide the IIR filter. In this case, a transmission function from the IIR filter can be configured to be approximately flat, thereby achieving low loss across each channel. In some implementations, signals may have 50 gigahertz (GHz) separations, such that, for example, transmit beams occur at N×100 GHz and receive beams occur at N×100 GHz+50 GHz, thereby providing interleaving with discrete channels and a channel separation greater than an information bandwidth. In this way, by providing free-space optics-based FIR or IIR filters, a bidirectional optical communications system may achieve higher efficiency, by having reduced insertion loss, reduced cross-talk, and/or reduced total loss.

FIGS. 1A-1I are diagrams of example bidirectional optical devices 100/100'/100". In some implementations, one or more of bidirectional optical devices 100/100'/100" may be a bidirectional optical filter or interleaver in an optical communications system.

As shown in FIG. 1A, bidirectional optical device 100 includes a first optical component 102 and a second optical component 104 separated by, for example, an air gap. In some implementations, first optical component 102 may be a glass or silica based MZ interferometer (MZI). In some implementations, second optical component 104 may include a reflector coating. For example, second optical component 104 may form an external dual mirror aligned to first optical component 102. In some implementations, second optical component 104 may include a reflector or set of reflectors disposed on a substrate, such as a glass substrate, a silica substrate, a lithium-aluminosilicate glass-ceramic substrate (e.g., Zerodur), among other examples, that has a relatively low coefficient of thermal expansion (CTE) to reduce temperature dependence of bidirectional optical device 100.

As further shown in FIG. 1A, first optical component 102 includes a reflector 108 on a portion of a first interface 106, an optical coating (e.g., an anti-reflectance (AR) coating 112 or, in another example, a reflector coating as described in more detail herein) on a second interface 110, and an internal splitting interface 114 disposed between the first interface 106 and the second interface 110. In some implementations, first optical component 102 may be approximately 1 millimeter (mm) in width from first interface 106 to second interface 110. Bidirectional optical device 100 may have, in some implementations, a total length in a range of 2 to 3 mm, a width of approximately 0.5 mm, and a height of approximately 0.8 mm, to achieve the performance described herein. In this case, use of bidirectional optical device 100 may enable a more compact package than other techniques for implementing an optical interleaver.

As an example, for a 100 GHz channel spacing with 50 GHz transmit beam to receive beam (Tx-Rx) spacing (e.g., Tx beams at N×100 GHz and Rx beams at N×100 GHz+50 GHz), bidirectional optical device 100 may achieve a Tx-Rx cross-talk of approximately −17 dB at a 10 GHz information bandwidth and an insertion loss of less than 0.5 dB for a transmit direction and for a receive direction, thereby reducing total loss relative to a wavelength independent 50:50 beam-splitter, as described above.

In some implementations, internal splitting interface 114 may be a 50% internal splitting interface. For example, internal splitting interface 114 may divide a beam (e.g., a collimated Gaussian beam) or signal into two parts with equal path lengths within first optical component 102. In this case, an additional path length outside of first optical component 102 (e.g., a free space optics path length as a result of reflection off second optical component 104) results in bidirectional optical device 100 having two unequal path lengths. In some implementations, bidirectional optical device 100 may form an unbalanced MZI. For example, first optical component 102 may form a balanced MZI, and second optical component 104 may be aligned to an optical path of the balanced MZI to increase a length of one arm of the balanced MZI, thereby forming an unbalanced MZI.

In this way, bidirectional optical device 100 achieves a tunable free-spectral range (FSR) for optical interleaving. Based on the optical paths within first optical component 102 being the same length (e.g., forming a balanced MZI), temperature dependence and/or dispersion effects associated with thermal expansion of first optical component 102 are minimized. Further, based on first optical component 102 being a glass material, thermal expansion of first optical component 102 is relatively small, resulting in further minimization of temperature dependence (e.g., across a range of temperatures, such as from 0 degrees Celsius (C.) to 70° C., which may be a typical range of operating temperatures for optical interleavers, or another range of temperatures) and/or dispersion effects relative to other techniques for constructing an optical interleaver. In this case, based on first optical component 102 and second optical component 104 being separated by an air gap, temperature independence and/or nulled dispersion are preserved for the unbalanced MZI formed by bidirectional optical device 100. When angles of incidence are relatively small, such as less than 20 degrees from normal, less than 10 degrees from normal, or less than 8 degrees from normal, polarization dependence is minimized for bidirectional optical device 100, thereby improving performance relative to higher angles of incidence. In some implementations, the angle of incidence may be controlled using another optical component, such as an intermediate lens, a collimating lens, a reflector, or a retro-reflector, among other examples.

Figure 1C:
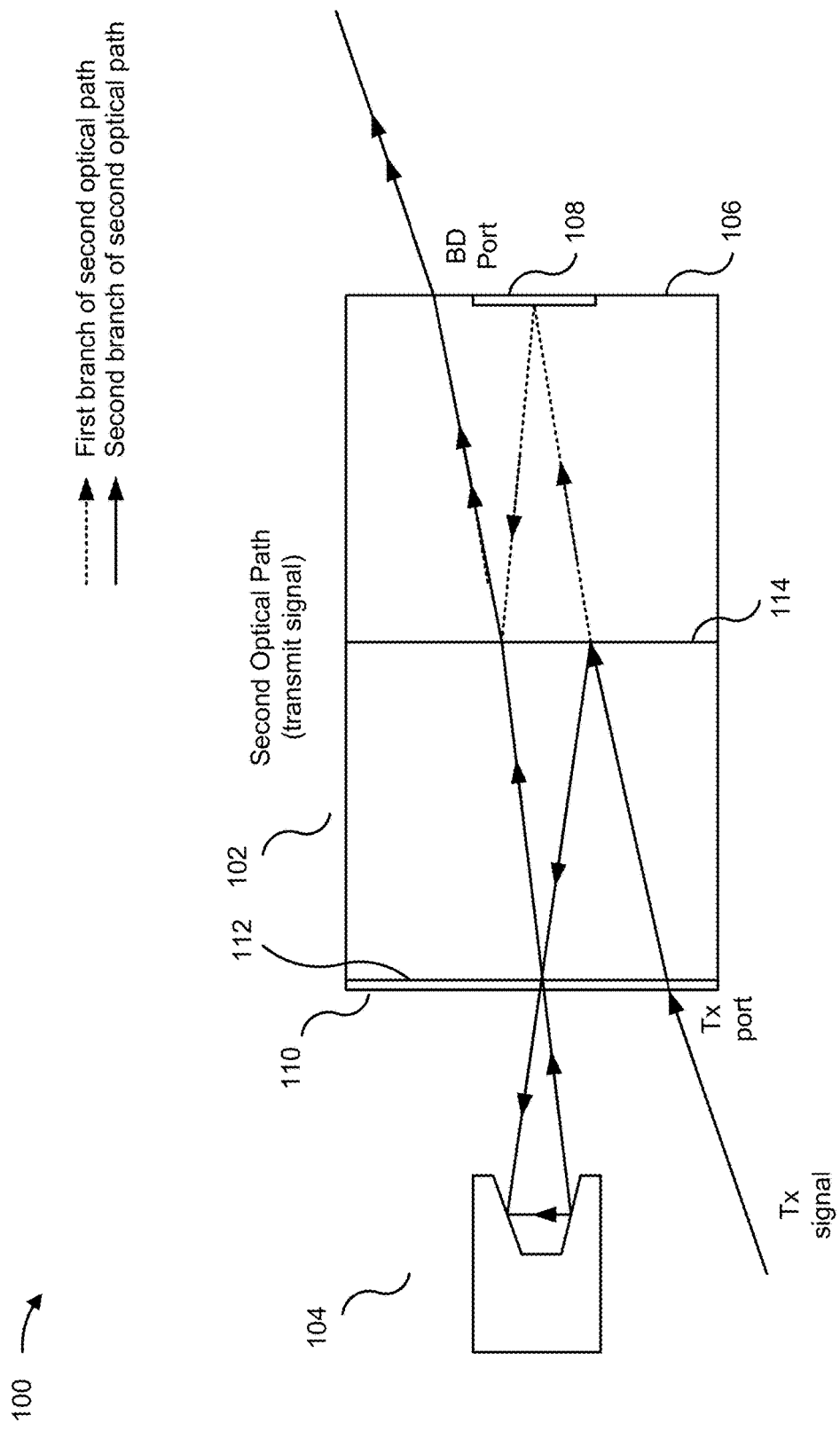
Figure 1D:
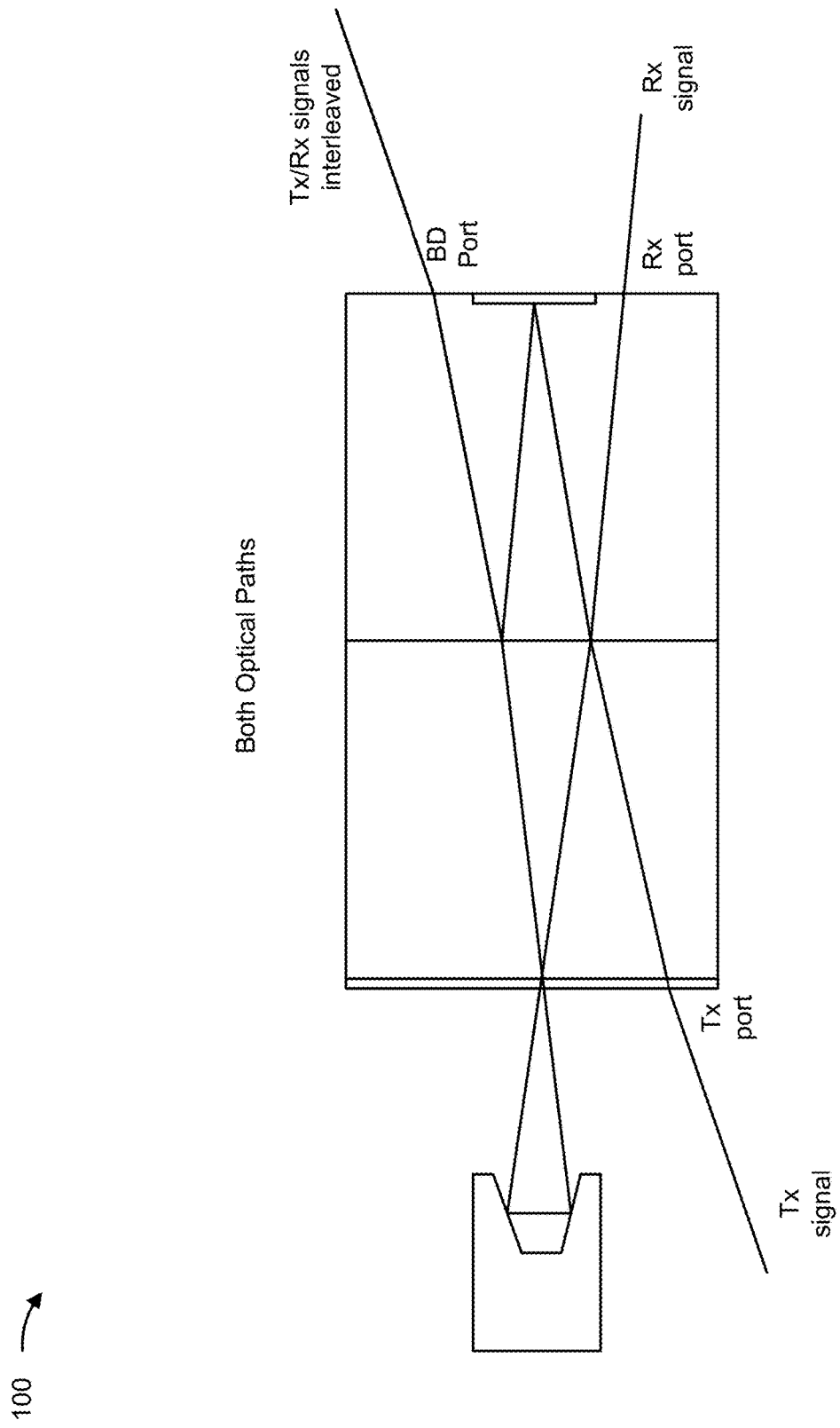

FIGS. 1B-1D show examples of optical paths of bidirectional optical device 100.

As shown in FIG. 1B, bidirectional optical device 100 may include a first optical path with a first branch and a second branch. The first optical path may convey an Rx beam that is incident on a bidirectional (BD) port at first interface 106 (e.g., a first portion of first interface 106 not covered by reflector 108, which is at a second portion of first interface 106) through first optical component 102 to internal splitting interface 114. At internal splitting interface 114, first optical component 102 may split the Rx beam, such that along the first branch, the Rx beam passes through to second interface 110 and AR coating 112, passes through to second optical component 104, is reflected back to AR coating 112 and second interface 110, passes through back to internal splitting interface 114, and passes through to an Rx port on first interface 106 (e.g., a portion of first interface 106 not covered by reflector 108). In contrast, along the second branch, the Rx beam is reflected to reflector 108, is reflected back to internal splitting interface 114, and is reflected back to the Rx port on first interface 106. In this case, between internal splitting interface 114 and the Rx port, as shown, the Rx beam on the first branch merges with the Rx branch on the second beam. A difference in path length between the first branch and the second branch results in a periodicity for the Rx signal, as described in more detail herein.

As shown in FIG. 1C, bidirectional optical device 100 may include a second optical path with a first branch and a second branch. The second optical path may convey a Tx beam that is incident on a Tx port at second interface 110 through first optical component 102 to internal splitting interface 114. At internal splitting interface 114, first optical component 102 may split the Tx beam, such that along the first branch, the Tx beam is reflected to second interface 110 and AR coating 112, passes through to second optical component 104, is reflected back to AR coating 112 and second interface 110, is passed through to internal splitting interface 114, and is passed through to the BD port on first interface 106. In contrast, along the second branch, the Tx beam is passed through to reflector 108, is reflected back to internal splitting interface 114, and is reflected back to the BD port on first interface 106. In this case, between internal splitting interface 114 and the BD port, as shown, the Tx beam on the first branch merges with the Tx branch on the second beam. A difference in path length between the first branch and the second branch results in a periodicity for the Tx signal, as described in more detail herein.

As shown in FIG. 1D, with the first optical path and the second optical path through bidirectional optical device 100, bidirectional optical device 100 forms a three-port bidirectional interleaver, where the Tx signal is alone at a Tx port, the Rx signal is alone at an Rx port, and the Tx and Rx signals are interleaved at a BD port.

Figure 1E:
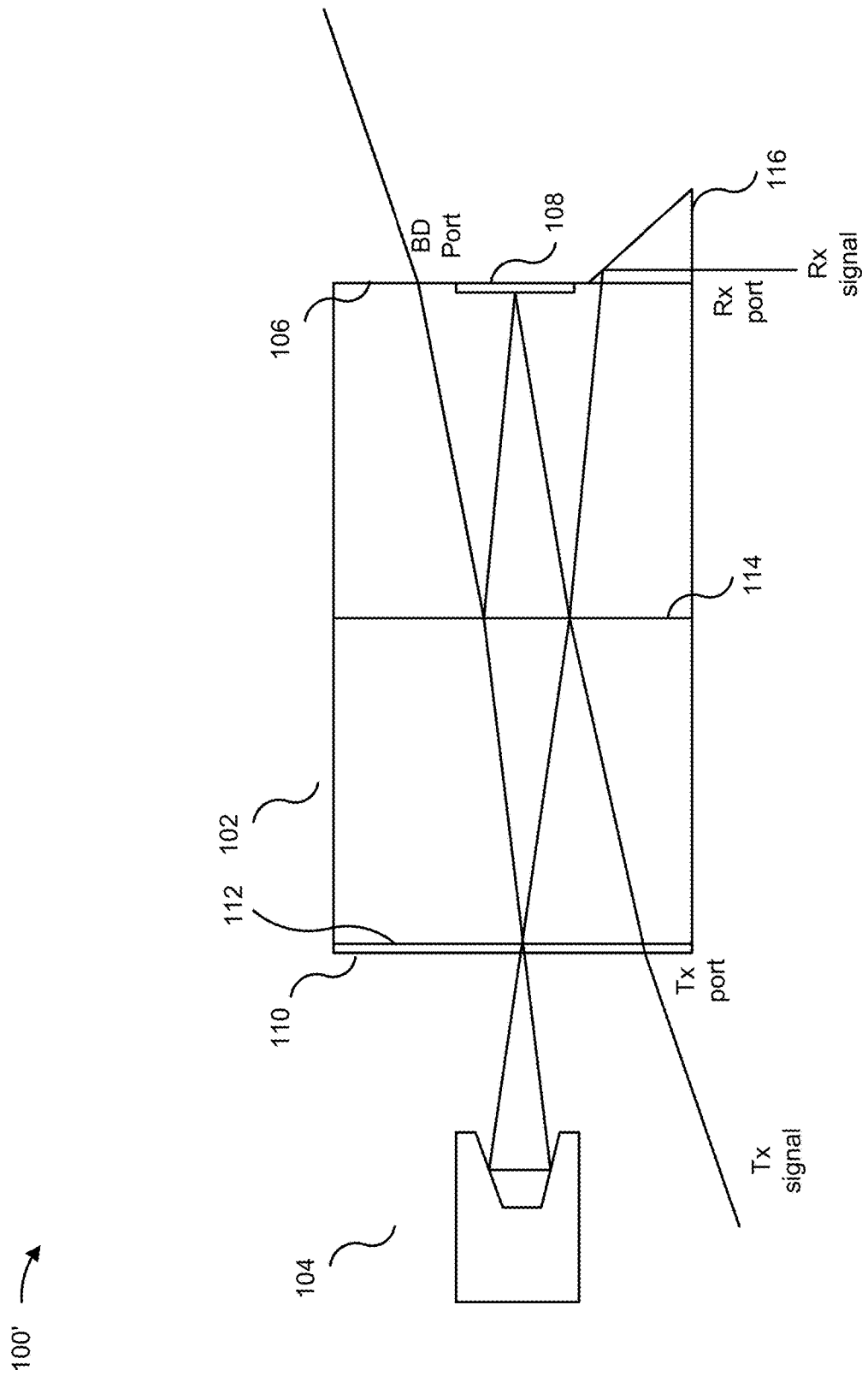

As shown in FIG. 1E, a bidirectional optical device 100' (e.g., which may correspond to bidirectional optical device 100) may further include a third optical component 116. For example, bidirectional optical device 100' may include a prism as third optical component 116 to deflect a direction of the Rx beam at the Rx port.

Figure 1F:
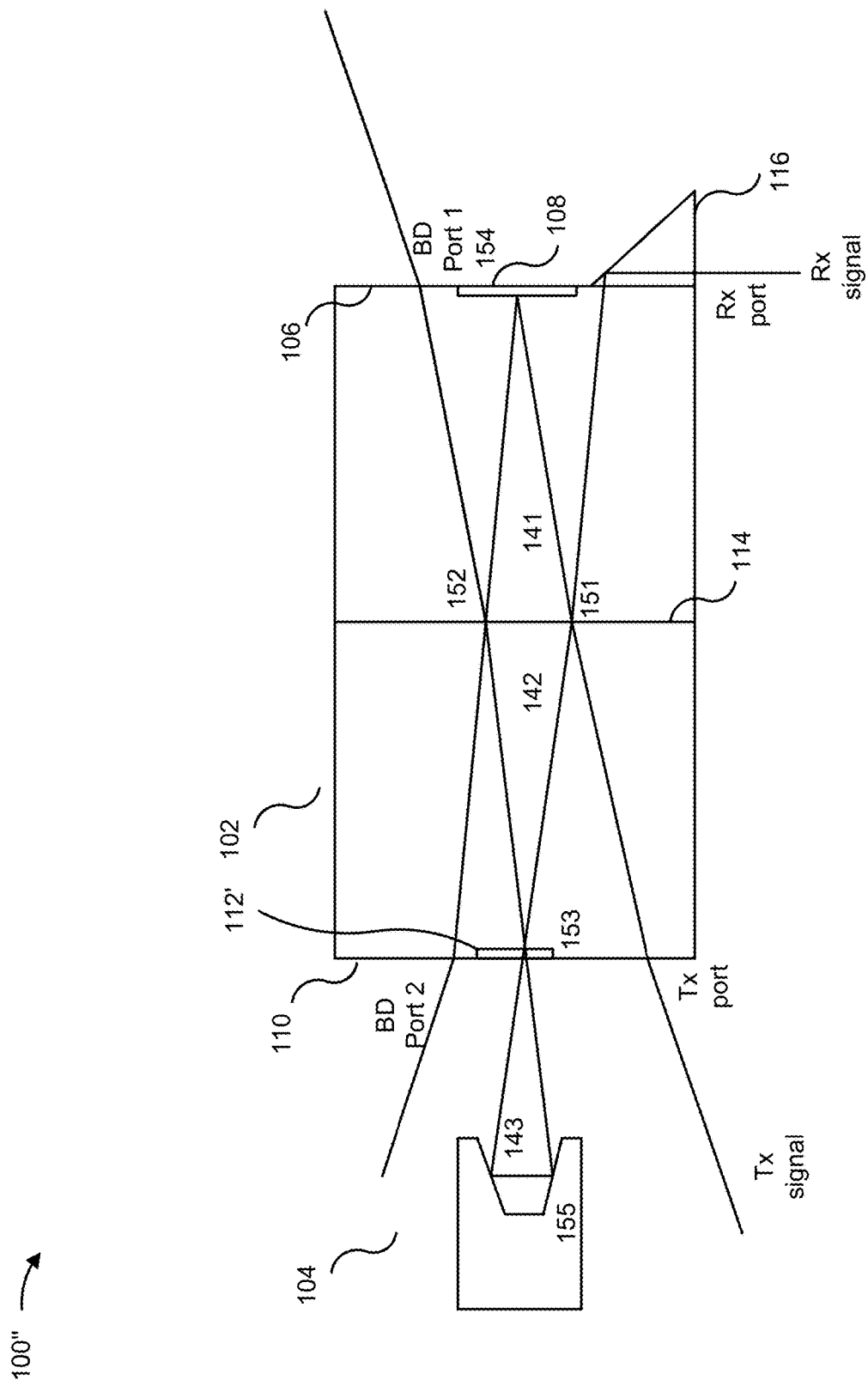

As shown in FIG. 1F, a bidirectional optical device 100" (e.g., which may correspond to bidirectional optical device 100') may have an AR coating 112' (e.g., which may correspond to AR coating 112) that covers only a portion of second interface 110. In this case, bidirectional optical device 100" may have multiple BD ports, such as a first BD port (e.g., on first interface 106 as in bidirectional optical devices 100/100') and a second BD port (e.g., on second interface 110). In this way, bidirectional optical device 100" can be used as a 4-port interleaver, rather than a 3-port interleaver, which may increase a flexibility in optical systems deployment. As further shown in FIG. 1F, bidirectional optical device 100" may have a set of optical distances 141 (D1), 142 (D2), and 143 (D3) between reflectors included therein and a set of reflectivities 151 (R1), 152 (R2), 153 (R3), 154 (R4), and 155 (R5) for reflectors included therein, as described in more detail herein. In some implementations, an FSR of bidirectional optical device 100" may correspond to the optical distance 142 (e.g., a distance between internal splitting interface 114, AR coating 112', and back to internal splitting interface 114). In some implementations, a cross-talk value for bidirectional optical device 100" may be based on a reflectivity value of 153 of AR coating 112'. The optical distances may be tuned by, for example, material size, geometry, and separation, and the reflectivities may be tuned by, for example, material type.

Figure 1G:
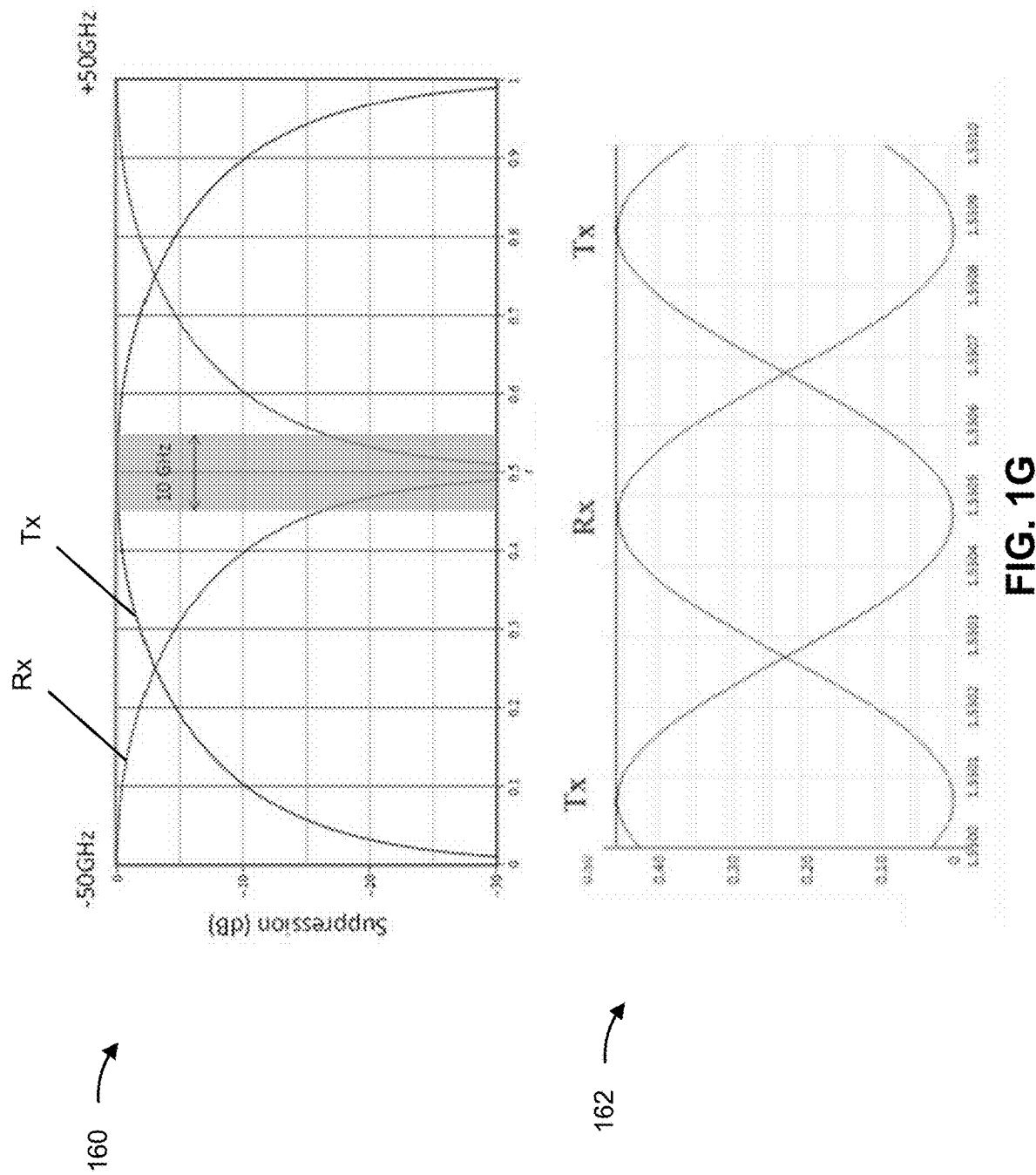

As shown in FIG. 1G, and by diagrams 160 (logarithmic scale) and 162 (linear scale), a frequency response for bidirectional optical device 100 is approximately sinusoidal with a cross-talk of approximately −17 dB over ±5 GHz.

Figure 1H:
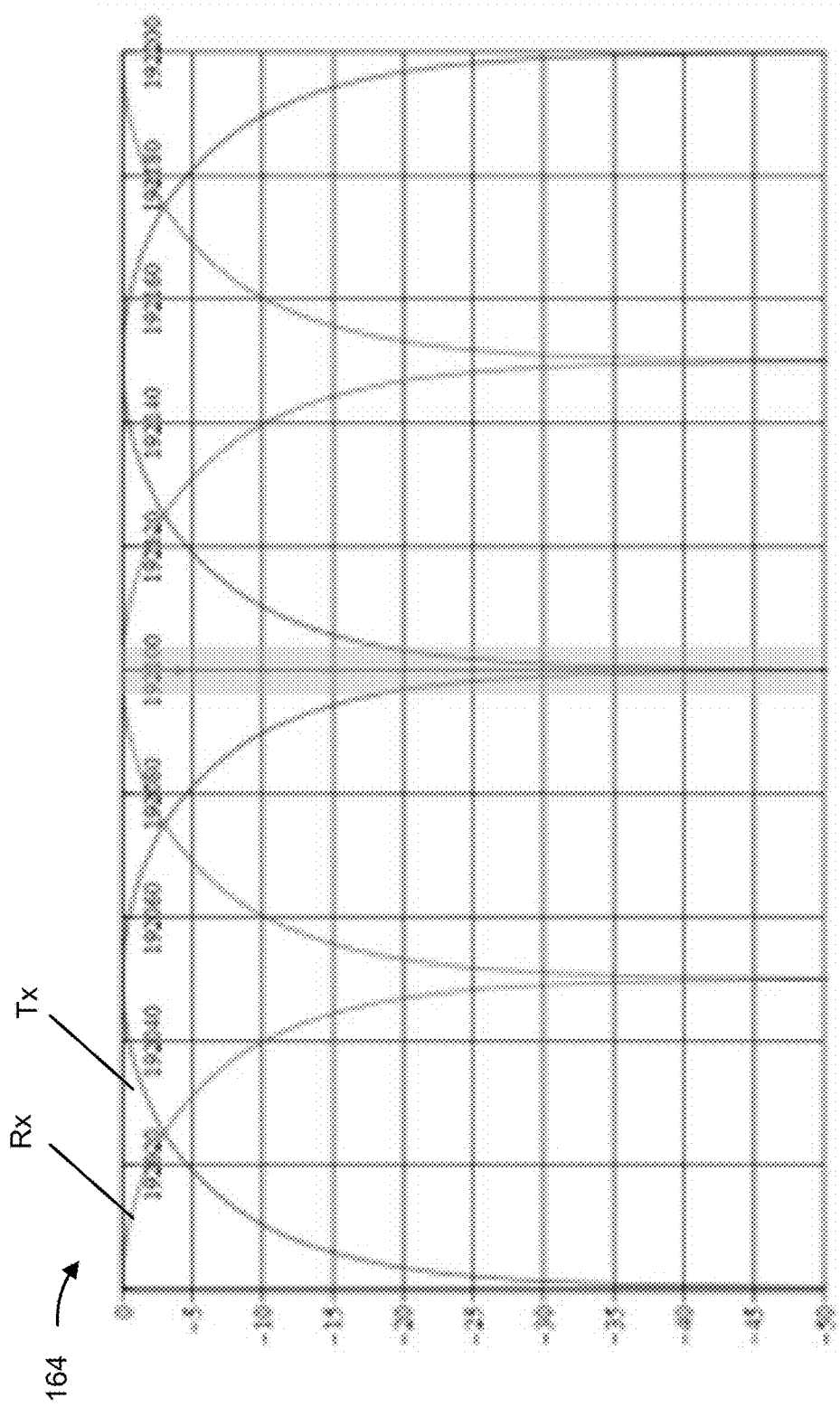

As shown in FIG. 1H, and by diagram 164, a frequency response for bidirectional optical device 100' is approximately sinusoidal with a cross-talk of approximately −16 dB over ±5 GHz and an insertion loss of less than 0.5 GHz. In some implementations, a bidirectional optical device described herein, such as bidirectional optical device 100/100'/100", may be used for a frequency range of, for example, 192.1 Terahertz (THz) to 196 THz.

Figure 1I:
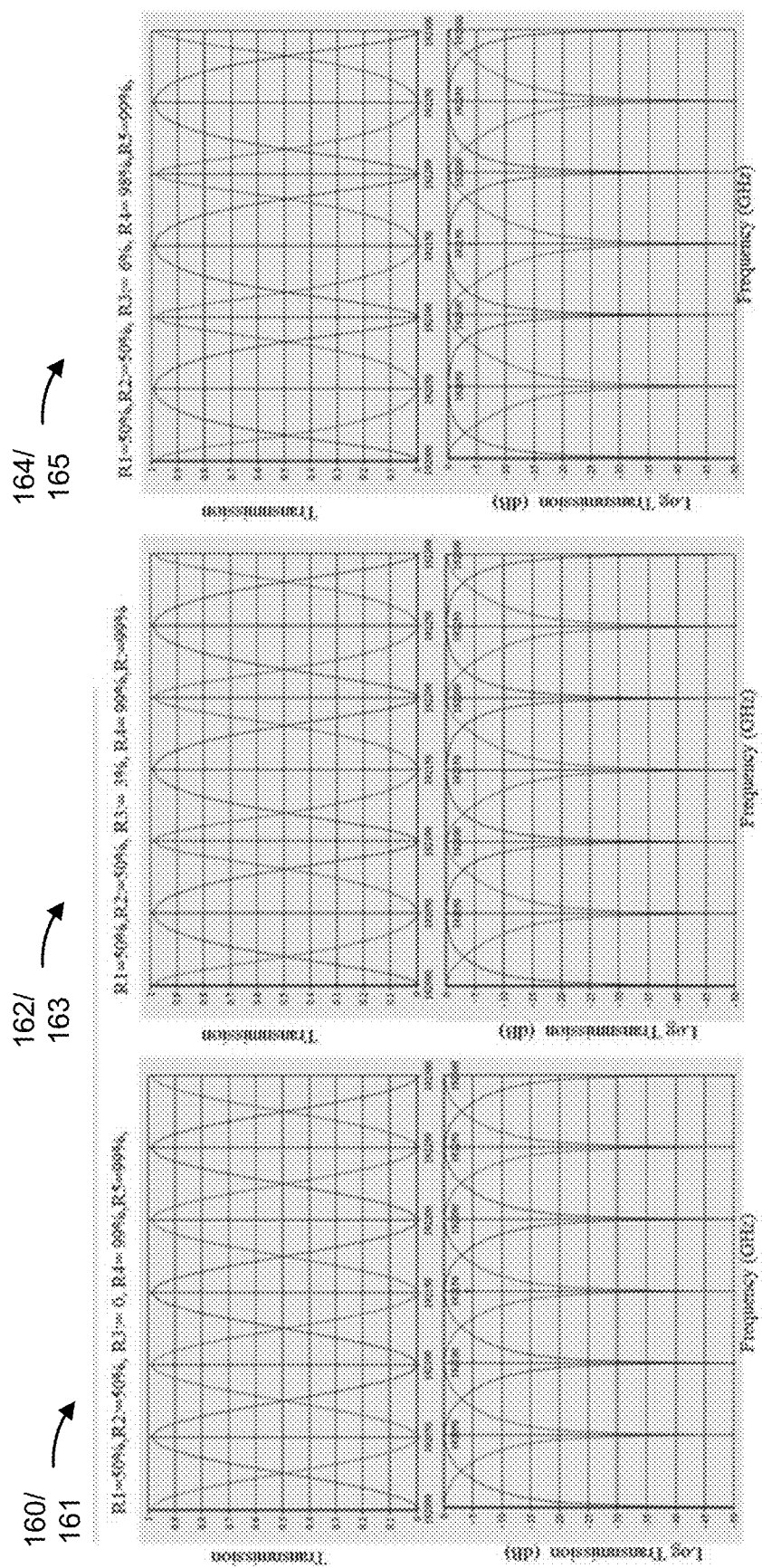

As shown in FIG. 1I, and by diagrams 160-165, a frequency response for bidirectional optical device 100" may be based on values for the set of reflectivities 151-155. As shown, a relatively flat-top response function may be achieved for some reflectivity ratios for reflectivities 151-155, such as for a ratio (R1:R2:R3:R4:R5) of 0.5:0.5:0.6:0.98:0.99.

As indicated above, FIGS. 1A-1I are provided as an example. Other examples may differ from what is described with regard to FIGS. 1A-1I.

FIGS. 2A-2D are diagrams of an example bidirectional optical device 200.

Figure 2A:
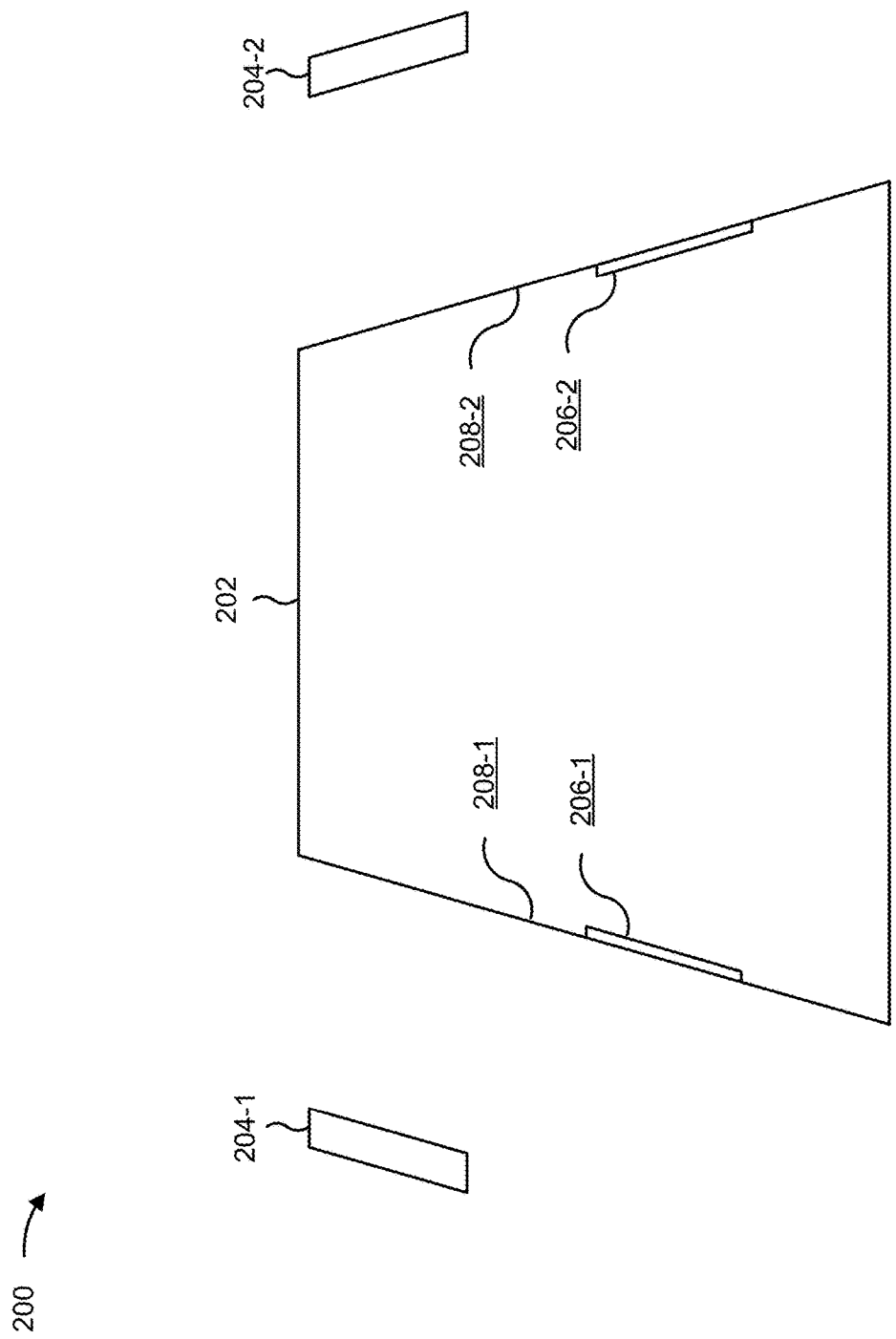
FIGS. 2A-2D are diagrams of an example bidirectional optical device described herein.

As shown in FIG. 2A, bidirectional optical device 200 includes a first optical component 202, a second optical component 204-1, and a third optical component 204-2. First optical component 202 may include a trapezoidal prism. For example, first optical component 202 may include a glass prism with a set of AR coatings 206 on a set of interfaces 208. In this case, first AR coating 206-1 may partially cover interface 208-1 and second AR coating 206-2 may partially cover interface 208-2. Optical components 204 may be a set of reflectors (e.g., mirrors). In some implementations, an FSR of bidirectional optical device 200 may be based on a path difference between a first portion of a beam going straight through first optical component 202 and a second portion of a beam having a path including reflection off of second optical component 204-1 and third optical component 204-2, as described herein.

Figure 2B:
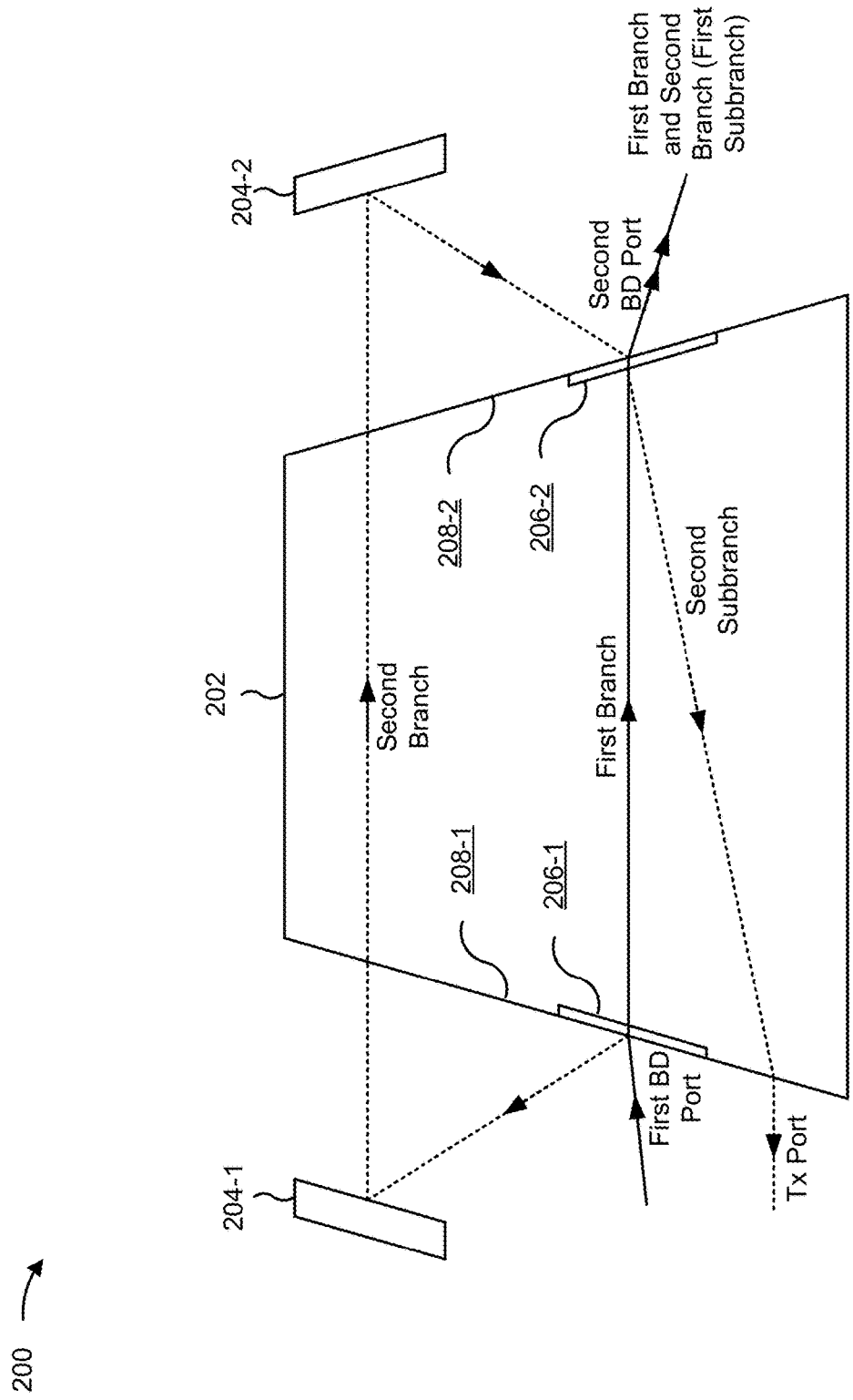

As shown in FIG. 2B, a first branch of a first optical path (for a Tx beam) may extend from a first BD port at first AR coating 206-1 through first optical component 202 to a second BD port at second AR coating 206-2. A second branch of the first optical path may reflect from first AR coating 206-1 to second optical component 204-1, reflect from second optical component 204-1 to third optical component 204-2 (e.g., through first optical component 202), and reflect from third optical component 204-2 to second AR coating 206-2. At second AR coating 206-2, the second branch splits into a first subbranch that passes through second AR coating 206-2 and first optical component 202 to a Tx port, and a second subbranch that reflects off second AR coating 206-2 and joins the first branch at the second BD port. Respective beam portions on respective branches or subbranches may interfere with each other when the respective branches or subbranches join. For example, a first beam portion from the first branch may interfere with a second beam portion from the second branch when exiting bidirectional optical device 200 at the second BD port.

Figure 2C:
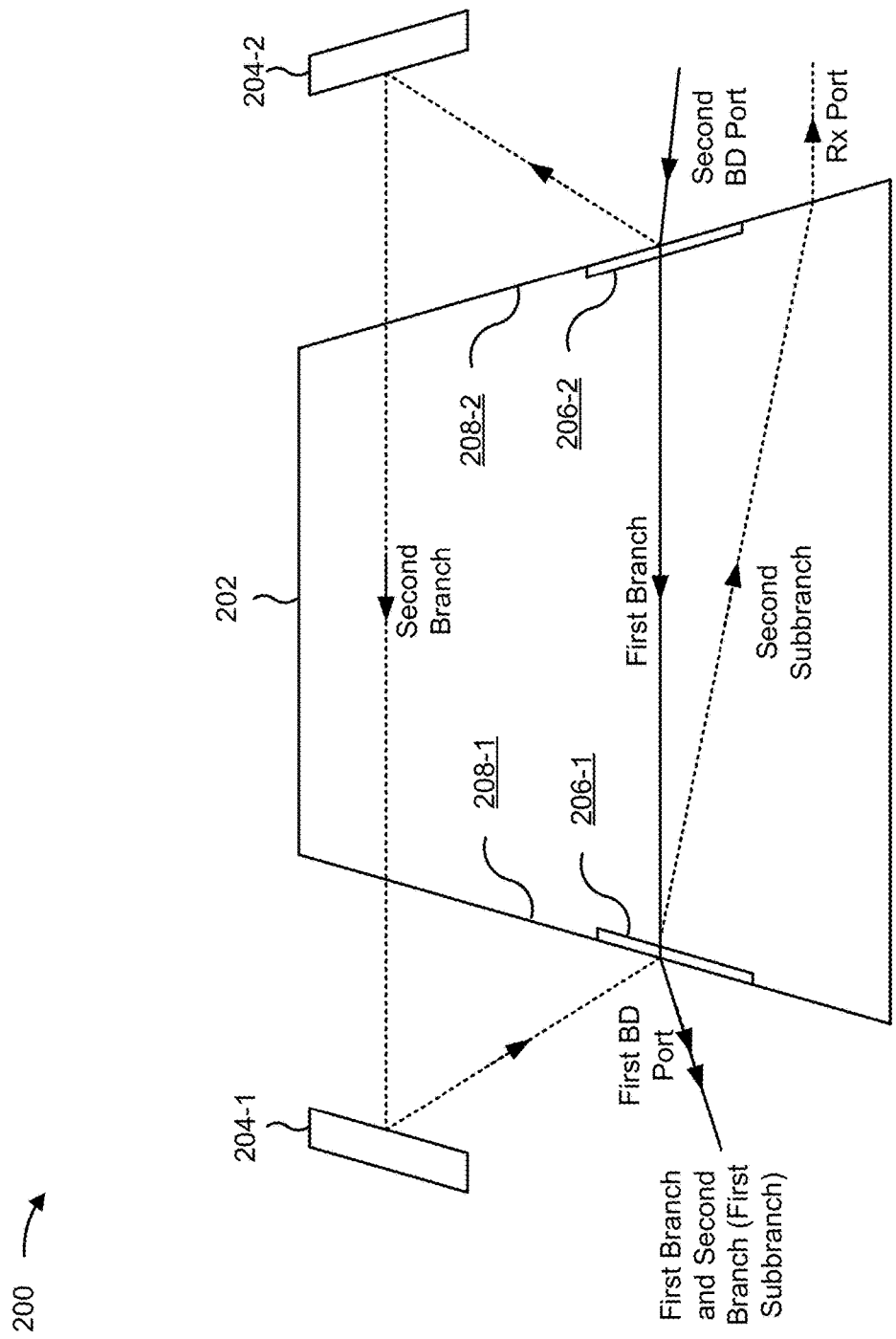

As shown in FIG. 2C, a first branch of a second optical path (for an Rx beam) may extend from the second BD port at second AR coating 206-2 through first optical component 202 to the first BD port at first AR coating 206-1. A second branch of the second optical path may reflect off second AR coating 206-2 to third optical component 204-2, reflect from third optical component 204-2 to second optical component 204-1 (e.g., through first optical component 202), and reflect from second optical component 204-1 to first AR coating 206-1. At first AR coating 206-1, the second branch splits into a first subbranch that passes through first AR coating 206-1 and first optical component 202 to an Rx port, and a second subbranch that reflects off first AR coating 206-1 and joins the first branch at the first BD port.

Figure 2D:
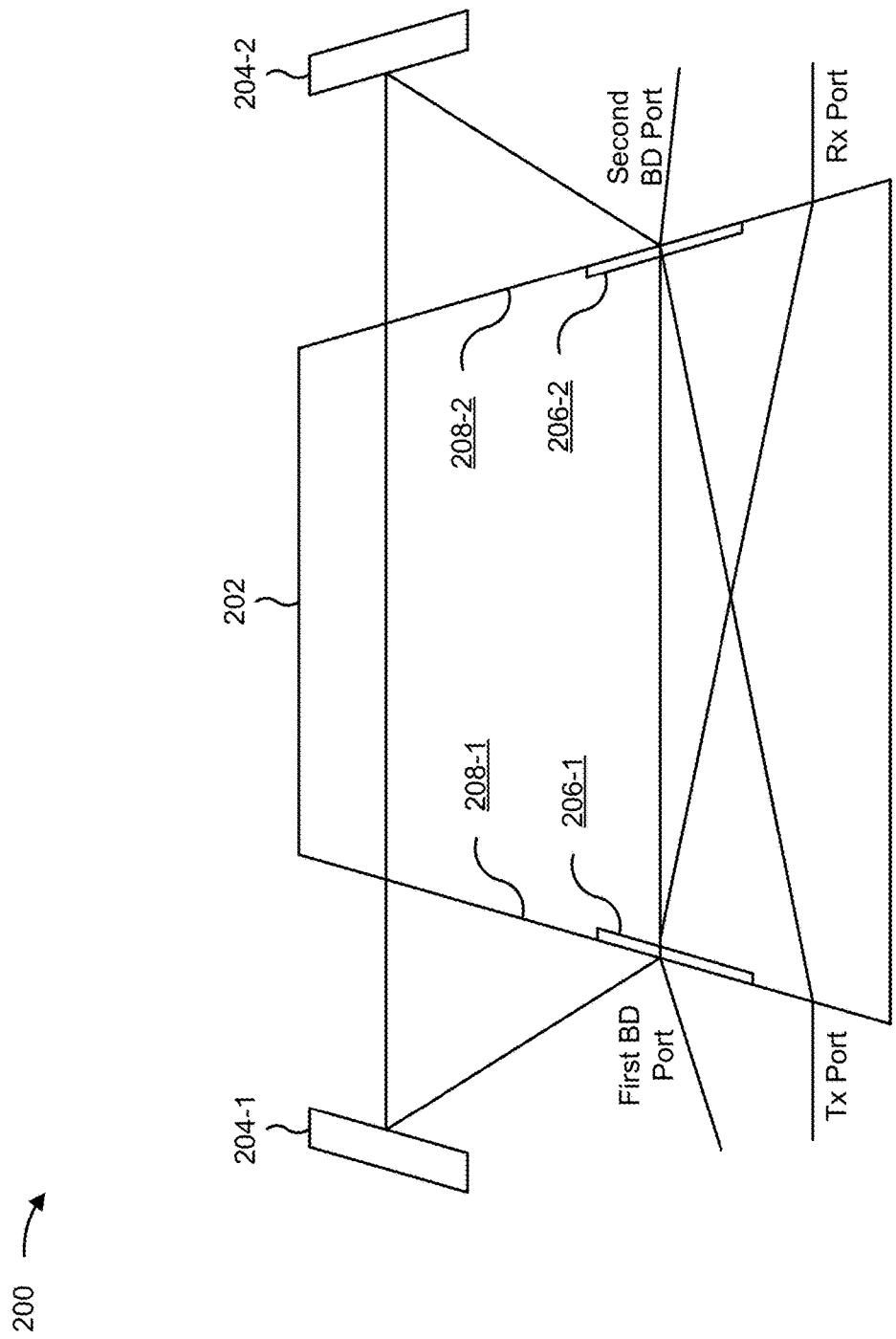

As shown in FIG. 2D, with the first optical path and the second optical path through bidirectional optical device 200, bidirectional optical device 200 forms a 4-port bidirectional interleaver, where the Tx signal is alone at a Tx port, the Rx signal is alone at an Rx port, and the Tx and Rx signals are interleaved at a first BD port and the second BD port. Based on optical paths extending through air and both optical paths (e.g., branches or arms of an MZI formed by bidirectional optical device 200) sharing an internal glass path (e.g., which may be slightly different as a result of a relatively small prism angle for bidirectional optical device 200), thermal sensitivity is relatively low, thereby achieving a high level of efficiency for bidirectional optical device 200 and/or an optical communication system that includes bidirectional optical device 200. For example, bidirectional optical device 200 may have a 50 GHz Tx-Rx channel separation with a Tx-to-Rx cross-talk of −16 dB for a channel width of ±0.5 GHz and an information bandwidth of 10 GHz.

As indicated above, FIGS. 2A-2D are provided as an example. Other examples may differ from what is described with regard to FIGS. 2A-2D.

FIGS. 3A-3H are diagrams of an example bidirectional optical device 300/300'. In some implementations, bidirectional optical device 300/300' may be a bidirectional optical filter or interleaver in an optical communications system.

Figure 3A:
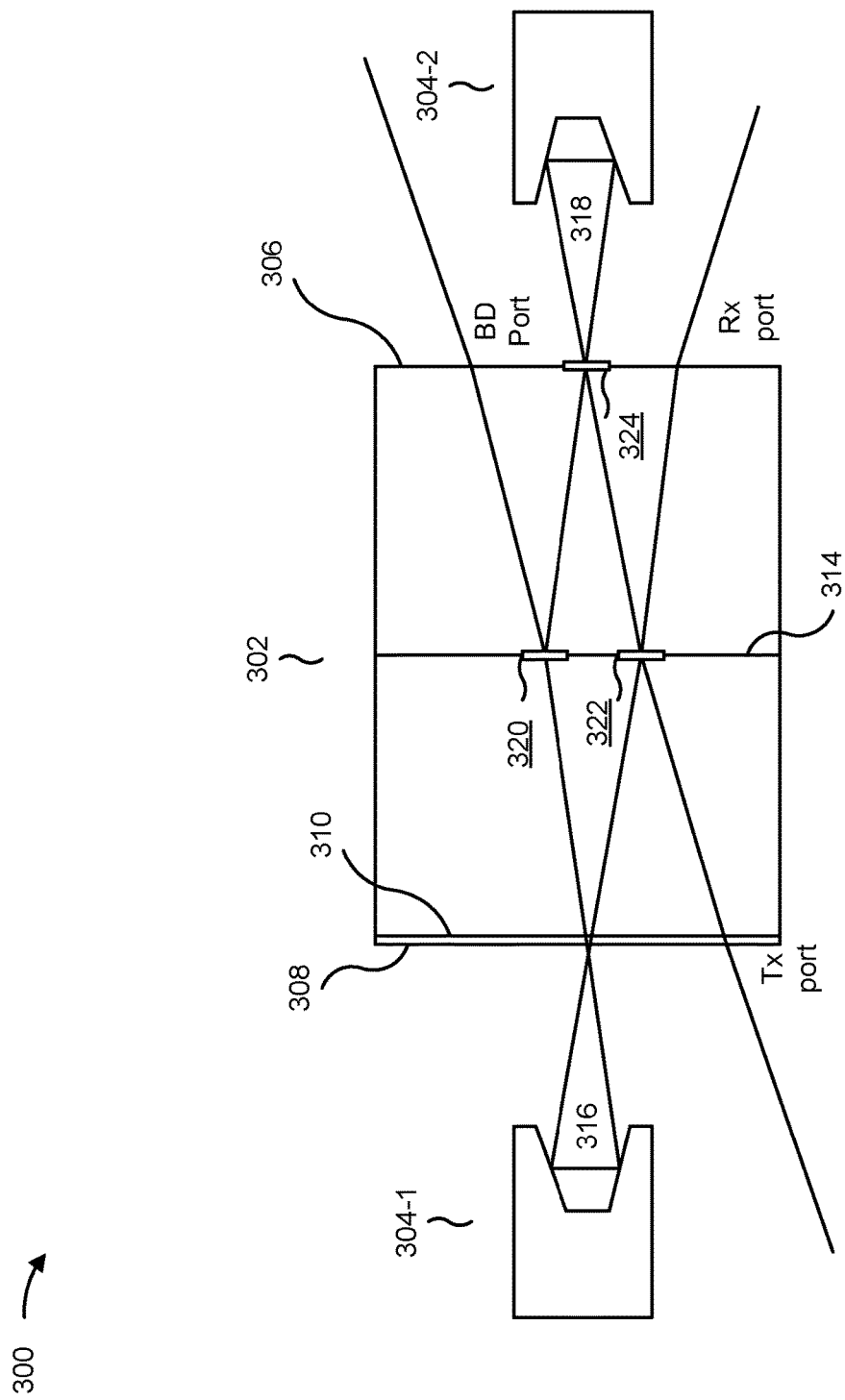
FIGS. 3A-3H are diagrams of an example bidirectional optical device described herein.
Figure 3B:
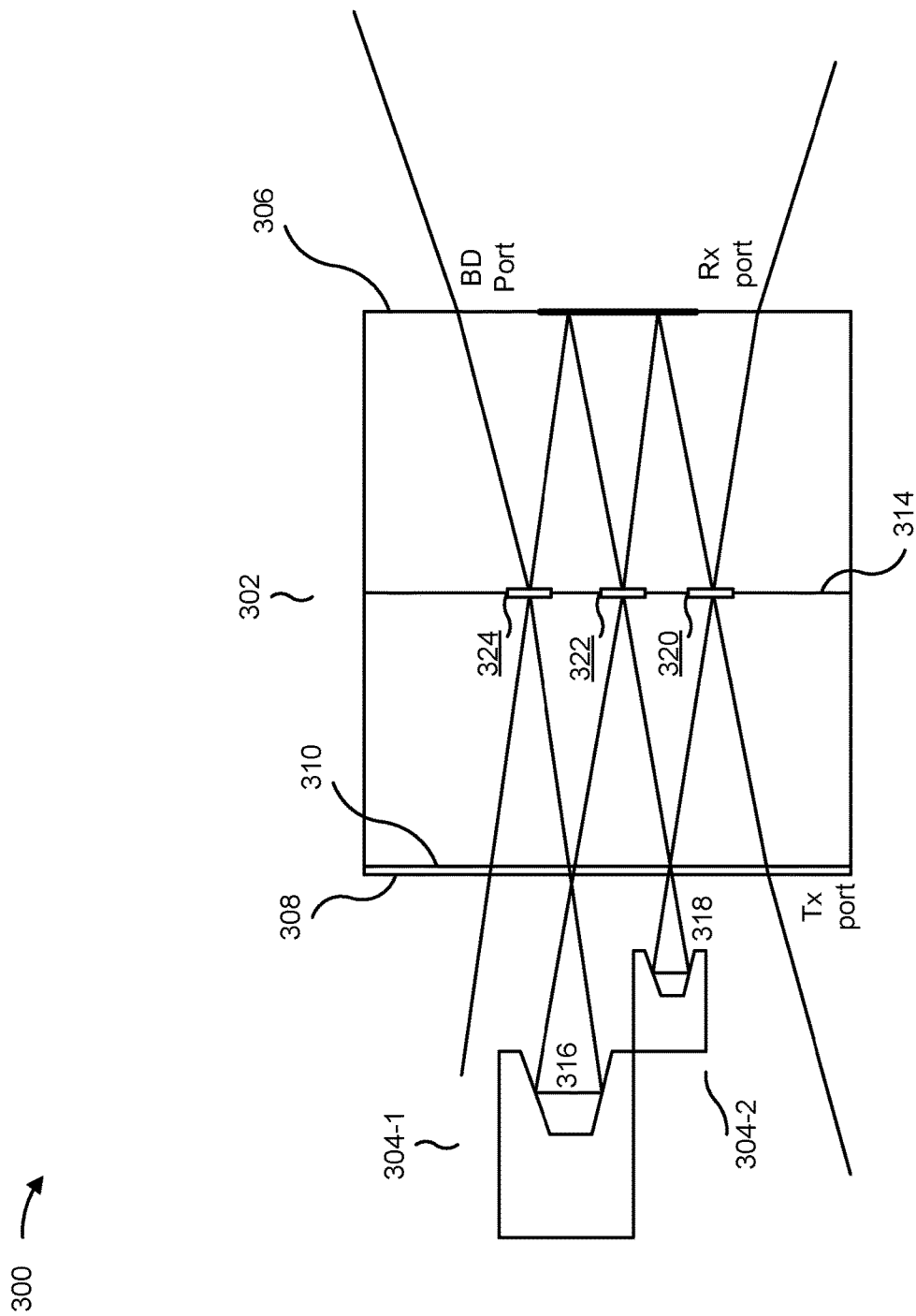

As shown in FIGS. 3A and 3B, bidirectional optical device 300 includes a first optical component 302, a second optical component 304-1, and a third optical component 304-2. In FIG. 3A, bidirectional optical device 300 includes second optical component 304-1 and third optical component 304-2 disposed on opposite sides of first optical component 302. In this case, first optical component 302 forms a single MZI. In contrast, in FIG. 3B, bidirectional optical device 300' includes second optical component 304-1 and third optical component 304-2 disposed on the same side of first optical component 302. In this case, first optical component 302 forms a double MZI.

As further shown in FIGS. 3A and 3B, first optical component 302 includes a first interface 306, an AR coating 308 on a portion of a second interface 310, and an internal splitting interface 312 between the first interface 306 and the second interface 310. In this case, adding third optical component 304-2 (e.g., as compared with, for example, bidirectional optical device 100 of FIG. 1) results in two external (e.g., air) circulating paths (e.g., external circulating path 316 for second optical component 304-1 and external circulating path 318 for third optical component 304-2, rather than a single external circulating path as for bidirectional optical device 100). A length of the external circulating paths 316/318 and/or a differential between respective lengths of the external circulating paths 316/318 may be configured to achieve a selected filter FSR. The use of two external circulating air paths results in an infinite optical path (e.g., portions of a signal looping between second optical component 304-1 and third optical component 304-2), thereby providing an infinite impulse response filter, which can have a flat-top transmission function. Achieving a flat-top transmission function enables achievement of minimized loss over a transmission channel pass band.

As further shown in FIG. 3A, internal splitting interface 314 may have two different splitting areas 320 and 322 with configured reflectivities (e.g., the same or different reflectivities) and first interface 306 may have a splitting area 324 with a configured reflectivity. Similarly, as shown in FIG. 3B, internal splitting interface 314 may have three different splitting areas 320, 322, and 324 with configured reflectivities (e.g., the same or different reflectivities). A configuration of the flat-top transmission function and associated transmission channel pass band may be based on the values for the configured reflectivities of the different splitting areas 320, 322, and 324.

Figure 3C:
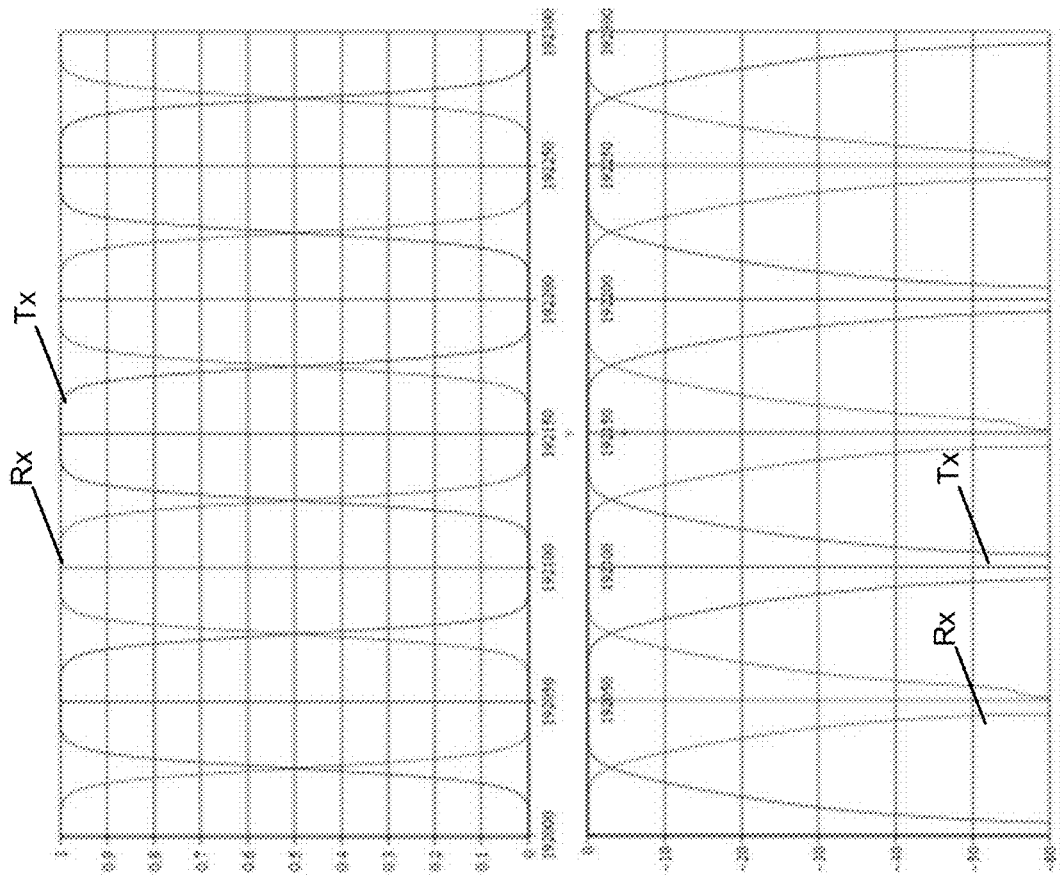
Figure 3D:
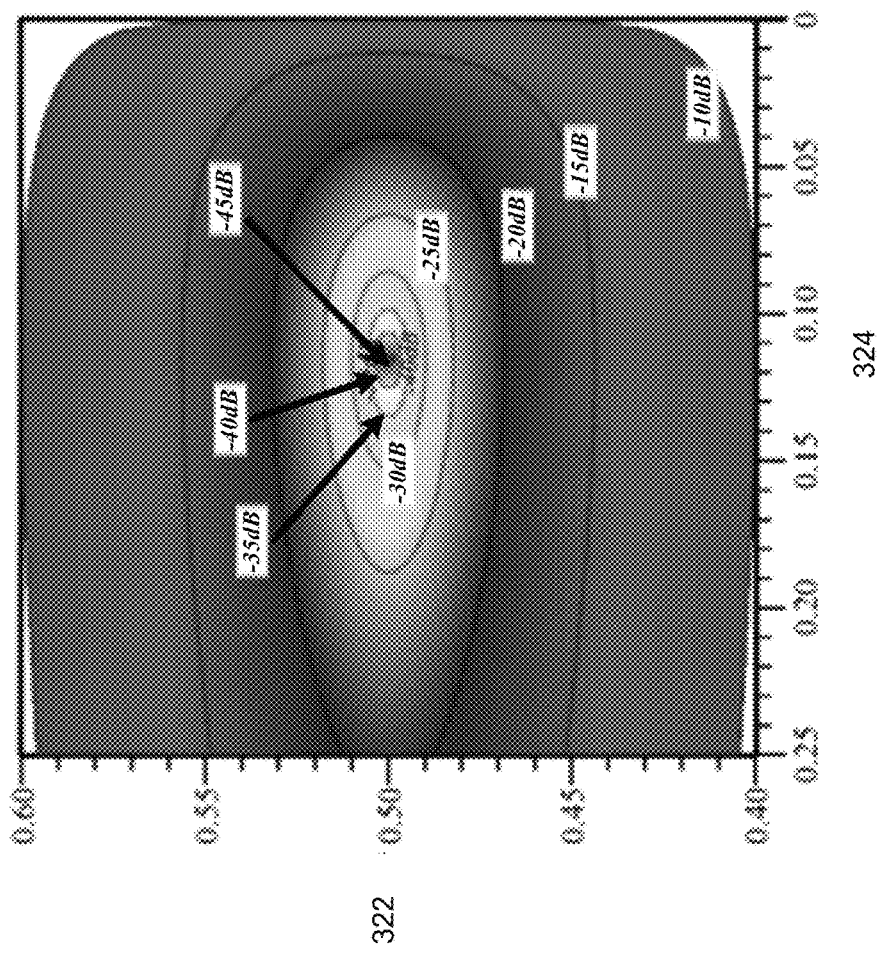
Figure 3E:
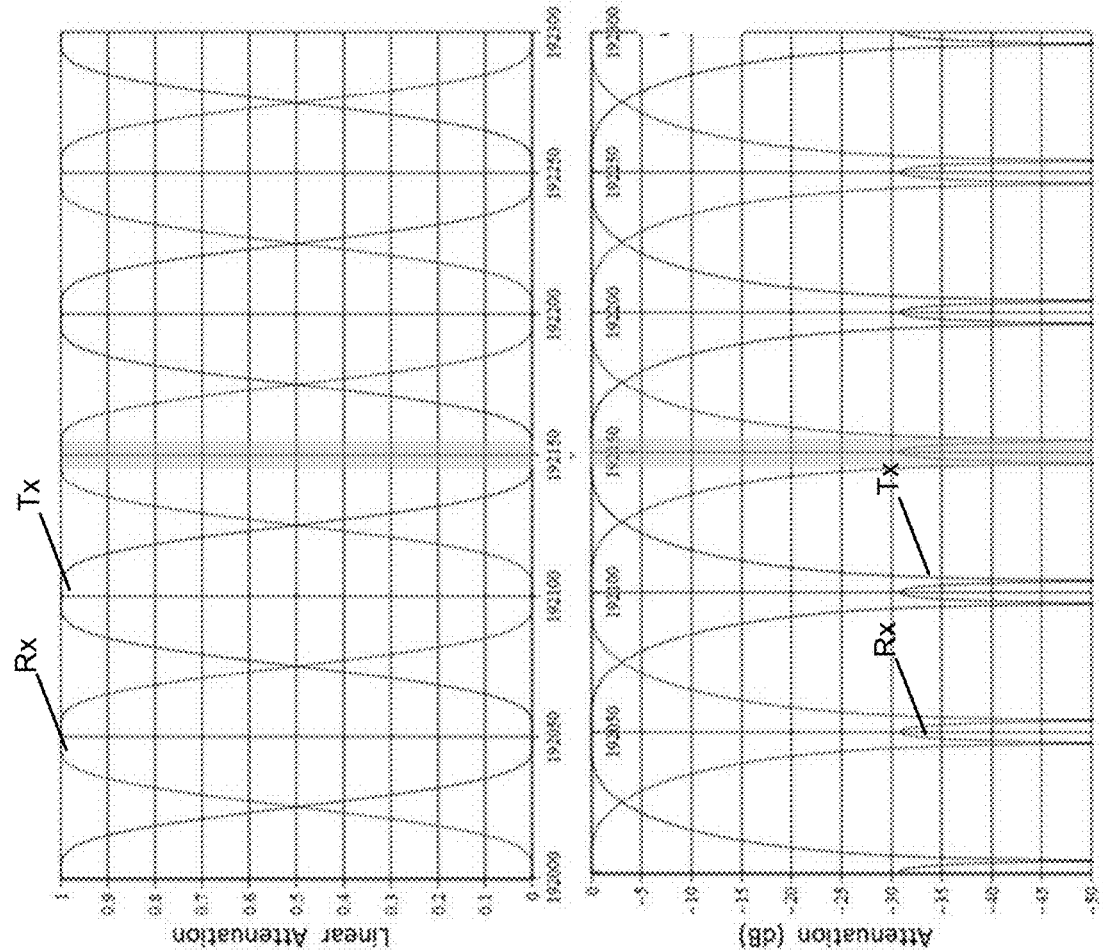
Figure 3F:
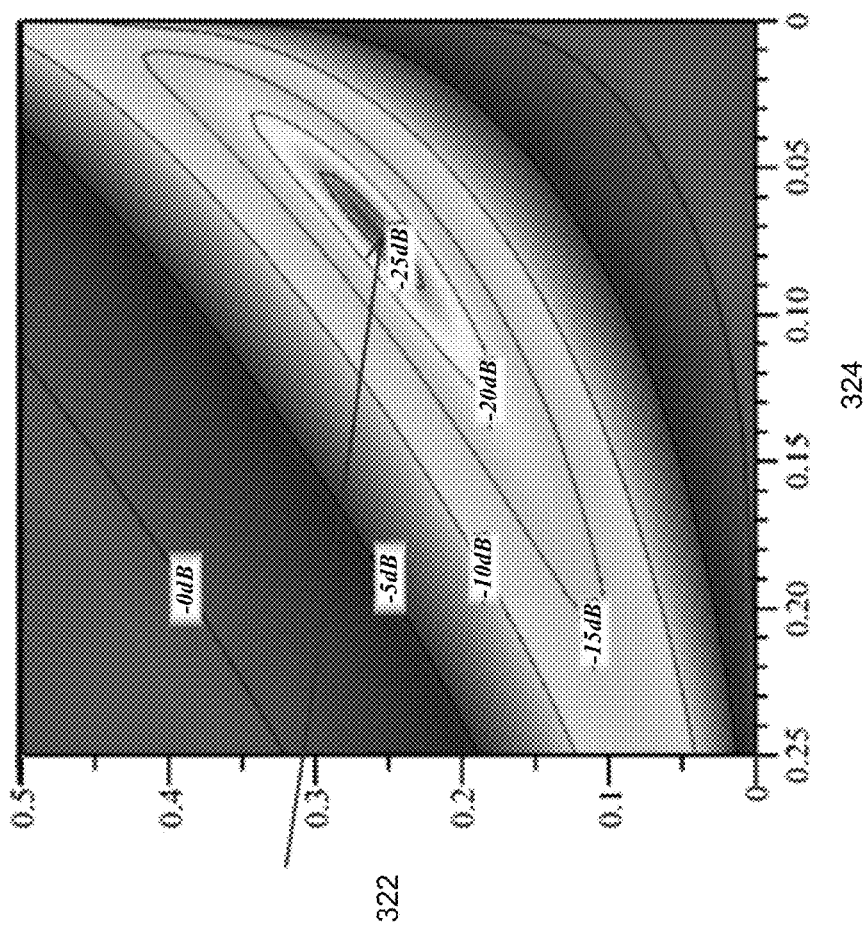

FIGS. 3C and 3D, and diagrams 330 and 332, respectively, show an example of the flat-top transmission function (e.g., where splitting area 324 has a reflectivity value that is twice a reflectivity value of splitting area 322) and cross-talk values for different example values for the configured reflectivities for bidirectional optical device 300 of FIG. 3A (e.g., with first optical component 302 being a silica material). For example, diagram 332 shows a contour plot of a variation of cross-talk values for variations in values for configured reflectivities of splitting area 324 and splitting area 322. As shown, a minimum value of the cross-talk is achieved at approximately R=0.5 for splitting area 322 and R=0.12 for splitting area 324, which achieves a cross-talk value of approximately −45 decibels (dB). In contrast, FIGS. 3E and 3F, and diagrams 340 and 342, respectively, show an example flat-top transmission function (e.g., with an optimized cross-talk value) and cross-talk values for different example values for the configured reflectivities for bidirectional optical device 300' of FIG. 3B. For example, diagram 342 shows a contour plot of a variation of cross-talk values for variations in values for configured reflectivities of splitting area 324 and splitting area 322. As shown, a minimum value of the cross-talk is achieved at approximately R=0.25 for splitting area 322 and R=0.13 for splitting area 324, which achieves a cross-talk value of approximately −25 dB.

Figure 3G:
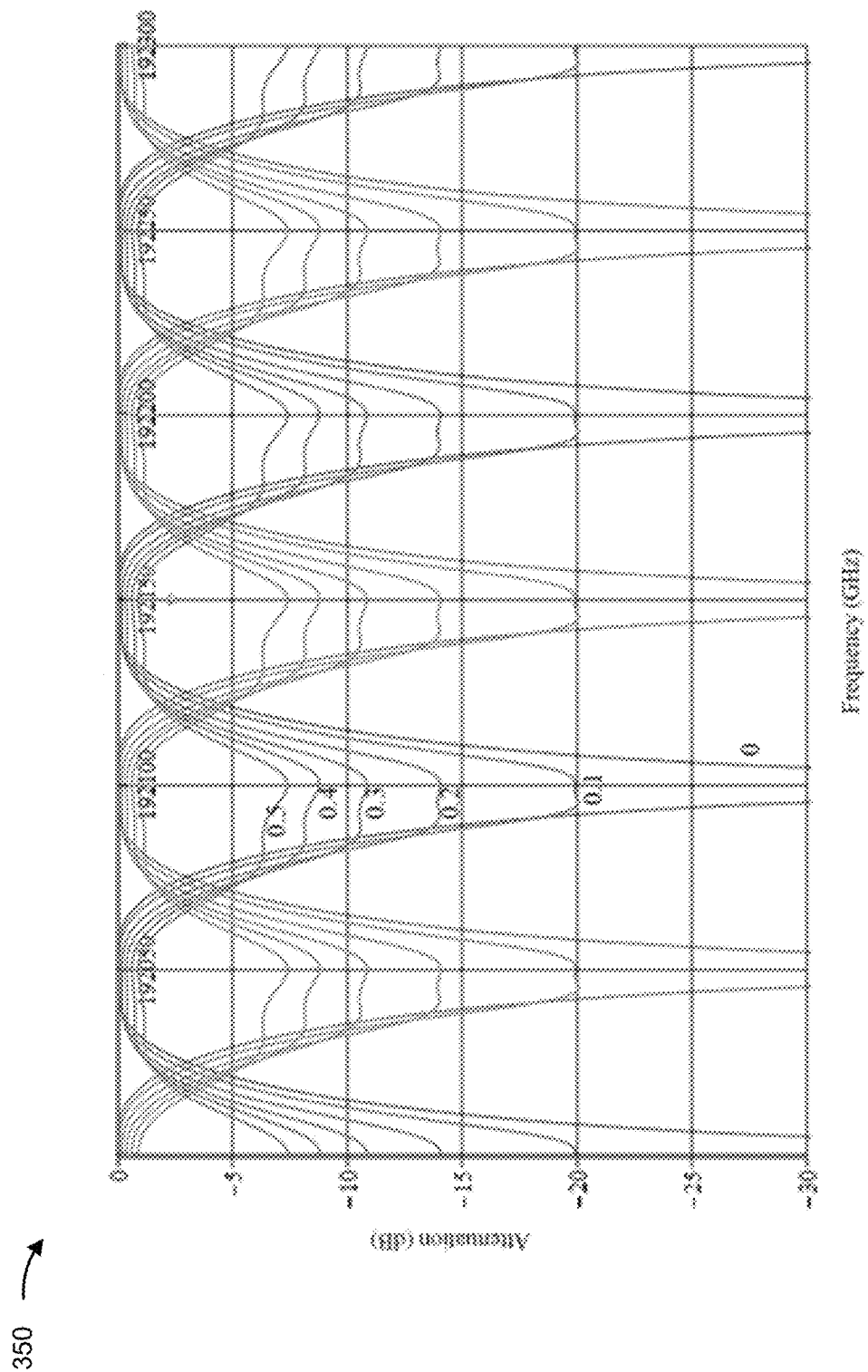
Figure 3H:
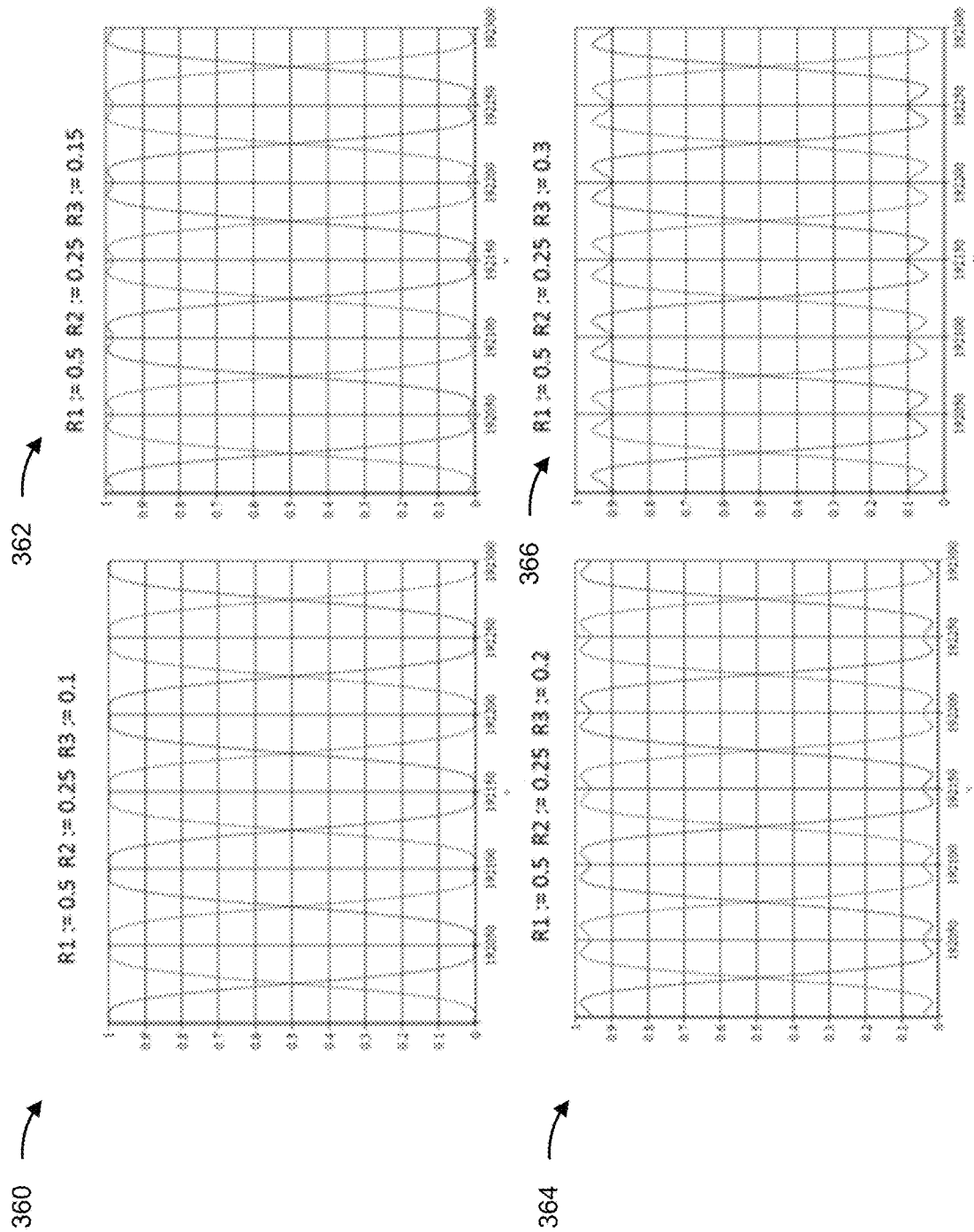

FIG. 3G, and diagram 350, show an example of different errors in arm lengths between reflector mirrors (e.g., optical components 304) and an MZ block (e.g., first optical component 302). As shown, for changes in arm length in a range of 0 micrometers (μm) to 0.5 μm, an amount of attenuation can differ significantly. Accordingly, some implementations described herein may use active alignment of optical components 304 to optical component 302 (e.g., alignment with a signal passing through bidirectional optical device 300/300' and being measured) to ensure a minimized arm length error. For example, with a signal passing through optical components 302 and 304, a distance between optical components 302 and 304 may be configured to control attenuation. FIG. 3H, and diagrams 360-66, show examples of different frequency responses, with a flatness of peaks of the frequency responses differing depending on reflectivity values R1 (e.g., splitting area 320), R2 (e.g., splitting area 322), and R3 (e.g., splitting area 324). As shown, a best flat-top response is achieved for a splitting ratio (R1:R2:R3) of 0.5:0.25:R3, where R3 is in a range of 0.1 to 0.3.

As indicated above, FIGS. 3A-3H are provided as an example. Other examples may differ from what is described with regard to FIGS. 3A-3H.

Figure 4A:
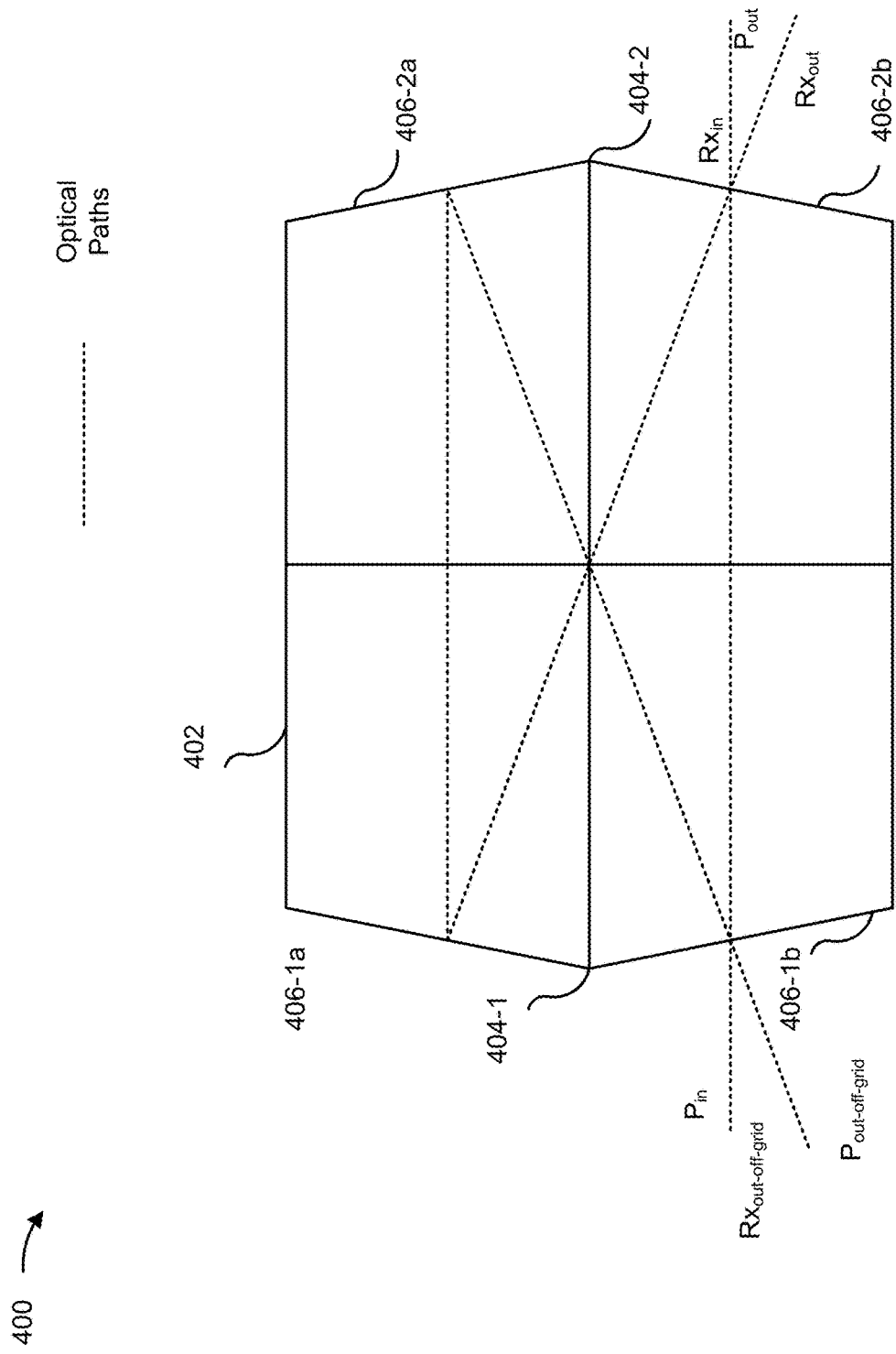
FIGS. 4A-4B are diagrams of an example cross-over etalon described herein.
Figure 4B:
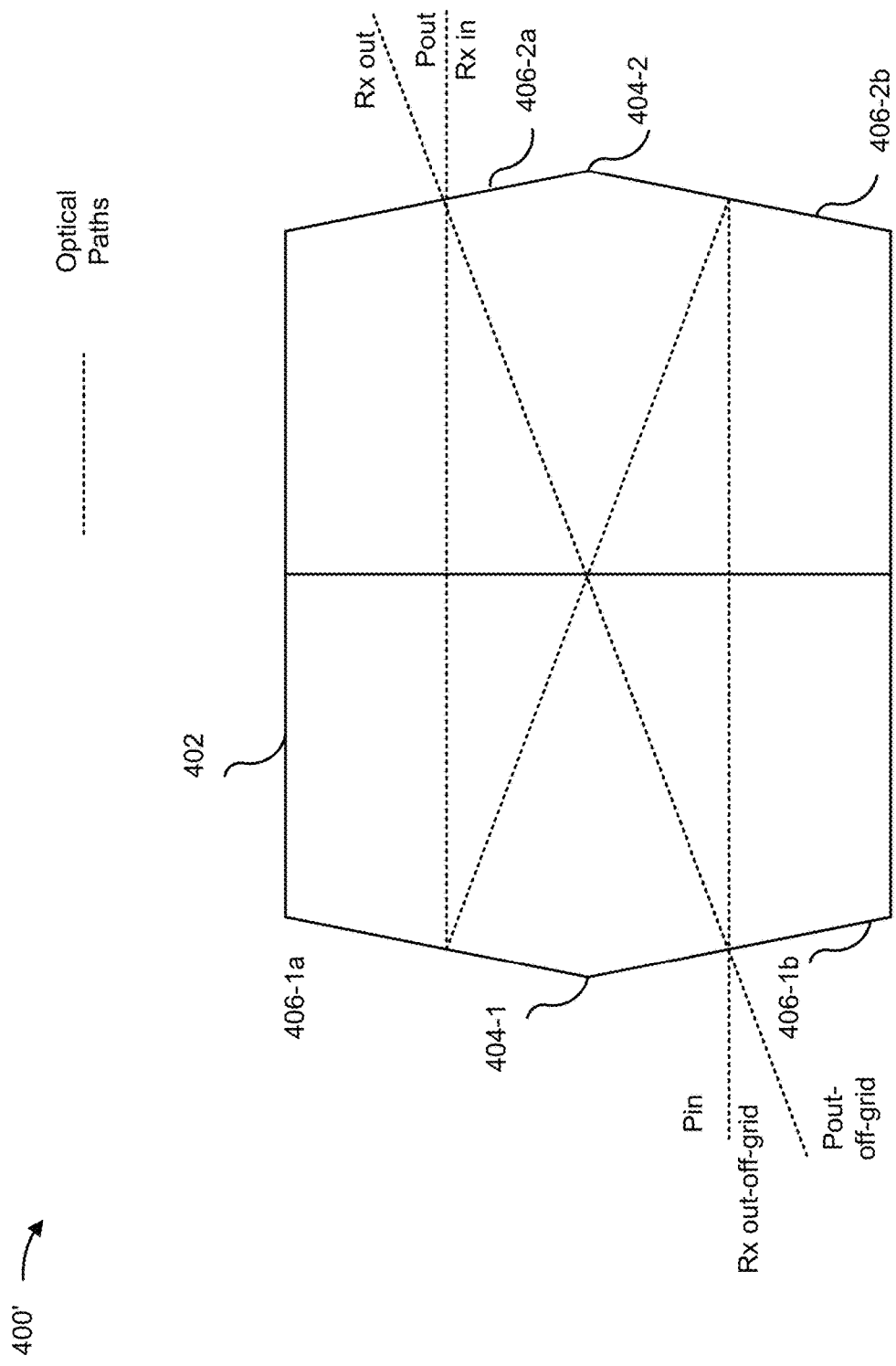

FIGS. 4A-4B are diagrams of an example cross-over etalon device 400/400'.

As shown in FIGS. 4A and 4B, etalon device 400/400' includes an optical component 402 that is a mirror-symmetric rhombus shape with opposing faces 404-1 and 404-2. Each opposing face includes an upper facet 406 and a lower facet 406. For example, face 404-1 includes upper facet 406-1*a* and lower facet 406-1*b,* and face 404-2 includes upper facet 406-2*a* and lower facet 406-2*b*. In FIG. 4A, mirrors may be positioned at upper facets 406-1*a* and 406-1*b*. Similarly, in FIG. 4B, mirrors may be positioned at upper facet 406-1*a* and lower facet 406-2*b*. This results in a 4-port device that can be used as an interleaver or compact etalon.

In some implementations, etalon devices 400/400' may be implemented with mirrors or a prism. In some implementations, facets of etalon devices 400/400' form a resonant cavity. In some implementations, ports of etalon device 400/400' are located on facets that are partially reflecting surfaces. For example, in FIG. 4A, lower facets 406-1*b* and 406-2*b* are partially reflecting surfaces (and upper facets 406-1*a* and 406-2*a* are fully reflecting surfaces). Similarly, in FIG. 4B, lower facet 406-1*b* and upper facet 406-2*a* are partially reflecting surfaces (and upper facet 406-1*a* and lower facet 406-2*b* are fully reflecting surfaces). As shown, etalon device 400/400' may be configured to receive two input beams, $P_{in}$ (e.g., which may be a Tx beam) and $RX_{in}$. Further, etalon device 400/400' may have two outputs $P_{out}$ and $Rx_{out}$, and two back reflected beams, $Rx_{out\text{-}off\text{-}grid}$ and $P_{out\text{-}off\text{-}grid}$.

As indicated above, FIGS. 4A-4C are provided as an example. Other examples may differ from what is described with regard to FIGS. 4A-4C.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A bidirectional optical device, comprising:
   a first optical component comprising a first solid material,
      wherein a portion of a first interface at a planar surface of the first optical component has a reflector coating,
      wherein another portion of the first interface at the planar surface is not covered by the reflector coating,
      wherein a second interface of the first optical component has an optical coating, and
      wherein the first optical component includes an internal splitting interface disposed between the first interface and the second interface; and
   a second optical component comprising a second solid material and including a reflector aligned to the second interface of the first optical component,
      wherein the first optical component and the second optical component comprise an unbalanced Mach-Zehnder (MZ) interferometer, and
      wherein the first optical component and the second optical component are separated by an air gap.

2. The bidirectional optical device of claim 1, wherein the first optical component comprises a balanced MZ interferometer.

3. The bidirectional optical device of claim 1, wherein the first optical component includes at least one bidirectional port at a second portion of the second interface with an optical path aligned through the first optical component to the second optical component.

4. The bidirectional optical device of claim 1, wherein the portion of the first interface is a first portion, and
   wherein the other portion is a second portion and includes at least one bidirectional port.

5. The bidirectional optical device of claim 4, wherein an optical path is provided from the bidirectional port through the first optical component to the second optical component.

6. The bidirectional optical device of claim 4, further comprising:
   a first optical path for a receive signal:
      the first optical path having a first branch from the bidirectional port to the internal splitting interface, from the internal splitting interface to the reflector coating, from the reflector coating to the internal splitting interface, and from the internal splitting interface to an receive signal port, and
      the first optical path having a second branch from the bidirectional port to the internal splitting interface, from the internal splitting interface to the second interface, from the second interface to the second optical component, from the second optical component to the second interface, from the second interface to the internal splitting interface, and from the internal splitting interface to the receive signal port; and a second optical path for a transmit signal,
the second optical path being directed from an output signal port to the internal splitting interface,
the second optical path having a first branch from the internal splitting interface to the reflector coating, from the reflector coating to the internal splitting interface, and from the internal splitting interface to the bidirectional port, and
the second optical path having a second branch from the internal splitting interface to the second interface, from the second interface to the second optical component, from the second optical component to the second interface, from the second interface to the internal splitting interface, and from the internal splitting interface to the bidirectional port.

7. The bidirectional optical device of claim 6, wherein a periodicity of the first branch of the first optical path relative to the second branch of the first optical path and a periodicity of the first branch of the second optical path relative to the second branch of the second optical path are based on a path length between the second interface of the first optical component and the reflector of the second optical component.

8. The bidirectional optical device of claim 6, wherein a first length of the first optical path within the first optical component and a second length of the second optical path within the second optical component are a same length.

9. The bidirectional optical device of claim 6, wherein angles of incidence of the first optical path and the second optical path are less than 10 degrees.

10. The bidirectional optical device of claim 1, further comprising:
a third optical component aligned to the first optical component, the third optical component configured to change a direction of at least one optical path of the bidirectional optical device.

11. A bidirectional optical device, comprising:
a first optical component comprising a first solid material,
wherein a portion of a first interface at a planar surface of the first optical component has a reflector coating,
wherein another portion of the first interface at the planar surface is not covered by the reflector coating,
wherein a second interface of the first optical component has an anti-reflectance coating, and
wherein the first optical component includes a set of internal splitting interfaces disposed between the first interface and the second interface, and
a set of second optical components each comprising a respective second solid material and including a corresponding set of reflectors,
wherein the first optical component and the set of second optical components comprises a three-port unbalanced Mach-Zehnder (MZ) interferometer, and
wherein the first optical component and the set of second optical components are separated by an air gap.

12. The bidirectional optical device of claim 11, wherein a first one of the set of second optical components is disposed opposite the first interface of the first optical component and a second one of the set of second optical components is opposite the second interface of the second optical component.

13. The bidirectional optical device of claim 11, wherein a first one of the set of second optical components is disposed opposite the second interface of the first optical component and a second one of the set of second optical components is opposite the second interface of the second optical component.

14. The bidirectional optical device of claim 11, wherein each optical component of the set of second optical components comprises a circulating ring for one or more optical paths associated with the bidirectional optical device.

15. The bidirectional optical device of claim 11, wherein the portion of the first interface is a first portion, and
wherein the other portion is a second portion and includes at least one bidirectional port.

16. The bidirectional optical device of claim 15, wherein an optical path is provided from the bidirectional port through the first optical component to the set of second optical components.

17. The bidirectional optical device of claim 15, further comprising:
a first optical path for a receive signal:
the first optical path having a first branch from the bidirectional port to at least one of the internal splitting interfaces, from the at least one of the internal splitting interfaces to the reflector coating, from the reflector coating to the at least one of the internal splitting interfaces, and from the at least one of the internal splitting interfaces to an receive signal port, and
the first optical path having a second branch from the bidirectional port to the at least one of the internal splitting interfaces, from the at least one of the internal splitting interfaces to the second interface, from the second interface to the set of second optical components, from the set of second optical components to the second interface, from the second interface to the at least one of the internal splitting interfaces, and from the at least one of the internal splitting interfaces to the receive signal port; and
a second optical path for a transmit signal,
the second optical path being directed from an output signal port to the at least one of the internal splitting interfaces,
the second optical path having a first branch from the at least one of the internal splitting interfaces to the reflector coating, from the reflector coating to the at least one of the internal splitting interfaces, and from the at least one of the internal splitting interfaces to the bidirectional port, and
the second optical path having a second branch from the at least one of the internal splitting interfaces to the second interface, from the second interface to the set of second optical components, from the set of second optical components to the second interface, from the second interface to the at least one of the internal splitting interfaces, and from the at least one of the internal splitting interfaces to the bidirectional port.

18. The bidirectional optical device of claim 17, wherein a periodicity of the first branch of the first optical path relative to the second branch of the first optical path and a periodicity of the first branch of the second optical path relative to the second branch of the second optical path are based on a path length between the second interface of the first optical component and the reflector of the set of second optical components.

19. The bidirectional optical device of claim 17, wherein a first length of the first optical path within the first optical component and a second length of the second optical path within the set of second optical components are a same length.

20. The bidirectional optical device of claim 17, wherein angles of incidence of the first optical path and the second optical path are less than 10 degrees.

* * * * *